US008780298B2

(12) United States Patent  
Sekiguchi et al.

(10) Patent No.: US 8,780,298 B2  
(45) Date of Patent: Jul. 15, 2014

(54) LIQUID CRYSTAL DISPLAY DEVICE

(75) Inventors: Yoshifumi Sekiguchi, Mobara (JP); Ikuo Hiyama, Hitachinaka (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 483 days.

(21) Appl. No.: 13/009,997

(22) Filed: Jan. 20, 2011

(65) Prior Publication Data

US 2011/0176086 A1    Jul. 21, 2011

(30) Foreign Application Priority Data

Jan. 20, 2010 (JP) ................. 2010-010310

(51) Int. Cl.
| | |
|---|---|
| G02F 1/1335 | (2006.01) |
| G02F 1/1333 | (2006.01) |
| F21V 7/04 | (2006.01) |
| G02B 6/00 | (2006.01) |

(52) U.S. Cl.
USPC ................. 349/65; 349/58; 349/61; 349/62; 362/615

(58) Field of Classification Search
CPC .. G02B 6/0046; G02B 6/0048; G02B 6/0058; G02B 6/0045; G02B 6/0063; G02F 1/133603; G02F 1/1336; G02F 1/133615; G02F 1/133524; G02F 1/133606; G02F 2001/133607; G09G 3/3406; H05K 1/0274; H05K 2201/10136; G09F 2013/049; B32B 2457/202

USPC ........ 349/58, 61–71; 362/27, 29, 31, 32, 615, 362/619, 609, 611; 345/84, 87

See application file for complete search history.

(56) References Cited

U.S. PATENT DOCUMENTS

| | | | | |
|---|---|---|---|---|
| 5,040,098 | A | * | 8/1991 | Tanaka et al. ................. 362/634 |
| 5,584,556 | A | * | 12/1996 | Yokoyama et al. ........... 362/625 |
| 5,980,054 | A | * | 11/1999 | Fukui et al. ................... 362/625 |
| 6,993,242 | B2 | * | 1/2006 | Winston et al. ............... 385/146 |
| 7,587,117 | B2 | * | 9/2009 | Winston et al. ............... 385/146 |
| 8,089,582 | B2 | * | 1/2012 | Sekiguchi et al. .............. 349/65 |
| 8,206,020 | B2 | * | 6/2012 | Nagata et al. ................. 362/609 |

(Continued)

FOREIGN PATENT DOCUMENTS

| | | |
|---|---|---|
| JP | 2005-238456 | 9/2005 |
| JP | 2005238456 A * | 9/2005 |

(Continued)

*Primary Examiner* — Michael Caley  
*Assistant Examiner* — Jia Pan  
(74) *Attorney, Agent, or Firm* — Antonelli, Terry, Stout & Kraus, LLP.

(57) ABSTRACT

A liquid crystal display device includes: a light guide plate having an emission surface emitting light to a liquid crystal panel and a plurality of side surfaces; and a plurality of light sources LEDPKG inputting light to the light guide plate from at least one side surface. The light guide plate is divided into a plurality of parts extending from the light inputted one side surface to an opposite side surface and the plurality of parts include at least one first part and at least one second part. The first part and the second part are adjacent to each other, and two-dimensionally overlap with the display area, respectively. At least the second part has a shape for emitting the light from an emission surface, and a sectional shape in the extending direction of the first part is greater than that of the second part.

24 Claims, 18 Drawing Sheets

(56) References Cited

U.S. PATENT DOCUMENTS

| | | |
|---|---|---|
| 2005/0184952 A1 | 8/2005 | Konno et al. |
| 2005/0189665 A1* | 9/2005 | Nishigaki ............... 264/1.1 |
| 2007/0085944 A1 | 4/2007 | Tanaka et al. |
| 2007/0153548 A1* | 7/2007 | Hamada et al. ............ 362/615 |
| 2007/0194340 A1 | 8/2007 | Akiba et al. |
| 2008/0002098 A1 | 1/2008 | Imajo et al. |
| 2008/0002412 A1 | 1/2008 | Tanaka et al. |
| 2008/0030650 A1* | 2/2008 | Kitagawa et al. ............ 349/65 |
| 2008/0129927 A1 | 6/2008 | Hamada et al. |
| 2008/0186431 A1 | 8/2008 | Imojo et al. |
| 2008/0297695 A1 | 12/2008 | Sekiguchi et al. |
| 2009/0040787 A1* | 2/2009 | Nagata et al. ............. 362/619 |
| 2009/0096957 A1 | 4/2009 | Hiyama et al. |
| 2009/0167990 A1 | 7/2009 | Konno et al. |
| 2009/0268122 A1* | 10/2009 | Takahashi ................ 349/58 |
| 2013/0057807 A1* | 3/2013 | Goto et al. ............... 349/65 |

FOREIGN PATENT DOCUMENTS

| | | |
|---|---|---|
| JP | 2005-301119 | 10/2005 |
| JP | 2006-156324 | 6/2006 |
| JP | 2007-144728 | 5/2007 |
| JP | 2007-220925 | 8/2007 |
| JP | 2008-10693 | 1/2008 |
| JP | 2008-14984 | 1/2008 |
| JP | 2008-191237 | 8/2008 |
| JP | 2009-9080 | 1/2009 |
| JP | 2009-98310 | 5/2009 |
| JP | 2009-163902 | 7/2009 |
| JP | 2010-8682 | 1/2010 |
| JP | 2010008682 A * | 1/2010 |
| JP | 2010-256912 | 11/2010 |
| WO | WO 2009/157355 A1 | 12/2009 |

* cited by examiner

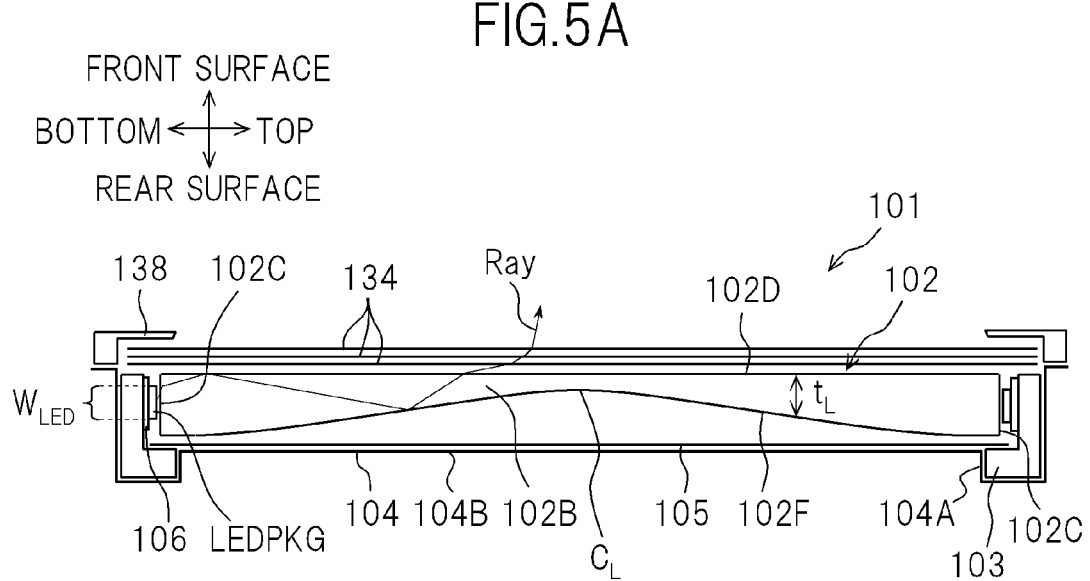

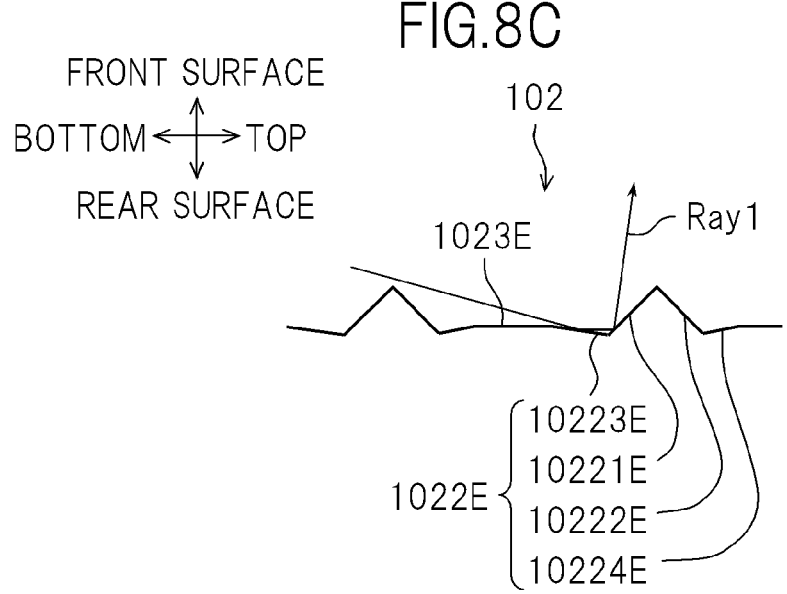
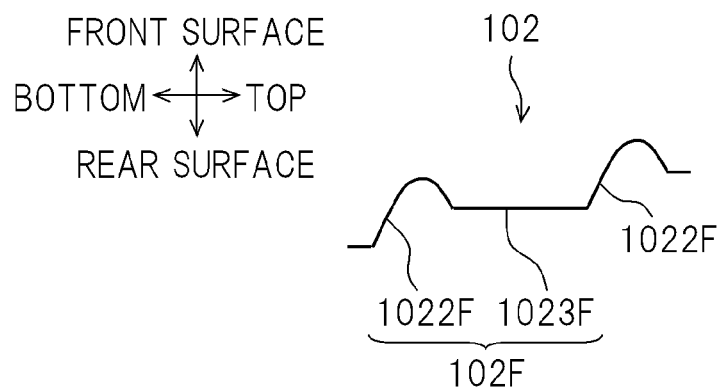
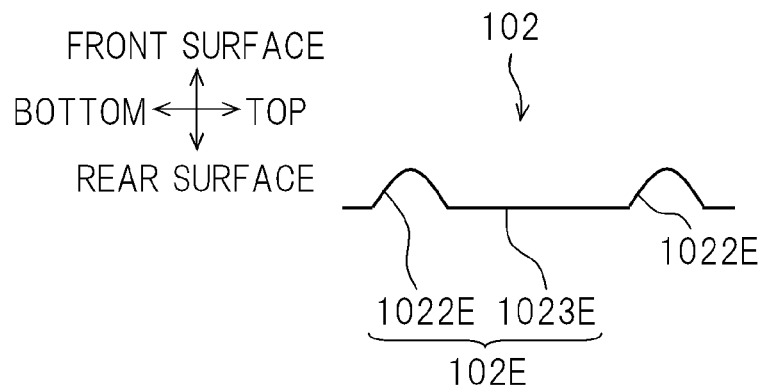

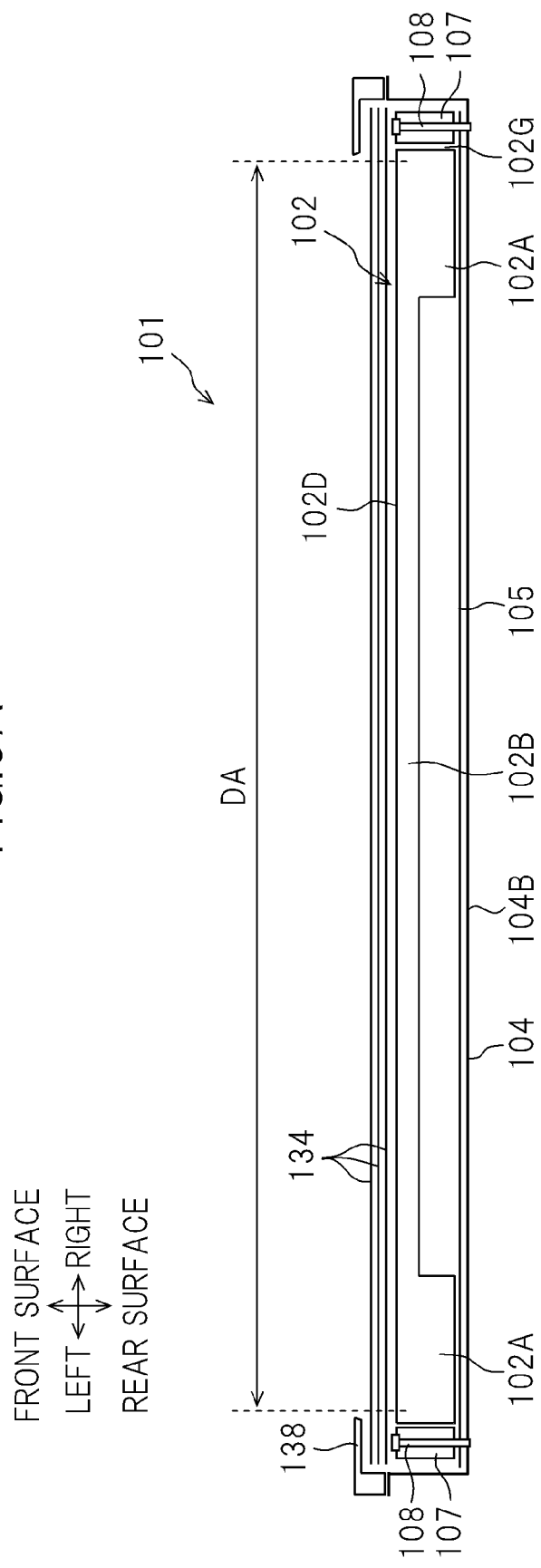

LIQUID CRYSTAL DISPLAY DEVICE

CROSS-REFERENCE TO RELATED APPLICATION

The present application claims priority from Japanese application JP2010-010310 filed on Jan. 20, 2010, the content of which is hereby incorporated by reference into this application.

BACKGROUND OF THE INVENTION

1. Field of the Invention

The present invention relates to a liquid crystal display device.

2. Description of the Related Art

Recently, emission type plasma display panels or non-emission type liquid crystal display devices have been increasingly used as a display device, instead of cathode ray tubes (CRTs).

The liquid crystal display devices employ a liquid crystal panel as a transmissive light modulating element and include an illumination unit (also referred to as "backlight") on the rear surface thereof to apply light to the liquid crystal panel. The liquid crystal panel forms an image by controlling a transmission ratio of the light applied from the backlight.

One feature of the liquid crystal display device is that it can be formed thinner than the CRT, and a liquid crystal display device with a smaller and smaller thickness has been required. Therefore, JP2006-156324A discloses a side backlight having a configuration in which a light emitting diode (LED) is used as a backlight source, the backlight source is not disposed in the rear surface of a liquid crystal panel but in a side, and light is applied from the rear surface of the liquid crystal panel using a light guide plate. JP2005-238456A discloses a light guide plate for a backlight having a diagonal size of 14 inches or more and a thicker side.

SUMMARY OF THE INVENTION

Since the side backlight employs a light guide plate, it is possible to reduce the thickness of the backlight. On the other hand, since the light guide plate is not included in a direct-type backlight in which a light source is disposed in the rear surface of the liquid crystal panel, the side backlight becomes heavy by the weight of the light guide plate.

In order to reduce the weight of the light guide plate, a configuration has been thought out in which the side surface of the light guide plate on which light is incident has a thickness equal to or more than the thickness of the light source and the thickness of the light guide plate decreases as it recedes from the light source.

However, when the thickness of the light guide plate decreases so as to reduce the weight, the strength of the light guide plate decreases. For example, when a light guide plate of which the thickness slowly decreases is used in a liquid crystal display device for a liquid crystal TV with a diagonal size of 26 inches or more or particularly 32 inches or more, the decrease in thickness of the light guide plate to about the thickest/thinnest ratio=2 to 8 so as to reduce the weight thereof causes a problem in the strength of the light guide plate.

In the light guide plate of which the thickness decreases as it recedes from the light source, for example, even when a rib is disposed in the outside of a display area, the strength of the light guide plate may not be satisfactorily improved.

The invention is made in consideration of the above-mentioned problems. A goal of the invention is to provide a liquid crystal display device having a light guide plate in which the maintenance in strength and the decrease in weight stand together.

According to an aspect of the invention, there is provided a liquid crystal display device including: a liquid crystal panel that has a display area for displaying an image; a light guide plate that has an emission surface emitting light to the liquid crystal panel and a plurality of side surfaces extending from the emission surface; and a plurality of light sources that inputs light to the light guide plate from at least one side surface of the plurality of side surfaces. Here, the light guide plate is divided into a plurality of parts extending from the one side surface to the side surface opposite to the one side surface and the plurality of parts include at least one first part and at least one second part. The first part and the second part are adjacent to each other, have different sectional shapes in the extending direction, and two-dimensionally overlap with the display area, respectively. At least the second part has a shape for guiding the light incident on the light guide plate and emitting the light from the emission surface. The first part has a sectional area of the sectional shape greater than that of the second part.

In the liquid crystal display device according to another aspect of the invention, the sectional area in the extending direction of the first part in the portion overlapping with the display area may be greater than the sectional area in the extending direction of the second part in the portion overlapping with the display area.

In the liquid crystal display device according to another aspect of the invention, the second part may include a thinnest portion having the smallest thickness in the second part, the thinnest portion may be located away from the at least one side surface by a predetermined distance. The first part may include an adjacent portion being adjacent to the thinnest portion at the position away from the one side surface by the predetermined distance, and the adjacent portion may have a thickness greater than that of the thinnest portion.

In the liquid crystal display device according to another aspect of the invention, the first part may have a thickness greater than the second part in the range from the adjacent portion to the position where is half of the predetermined distance away from the one side surface.

In the liquid crystal display device according to another aspect of the invention, the thickness of the thinnest portion may be equal to or less than ¾ of the thickness of the one side surface in the second part.

In the liquid crystal display device according to another aspect of the invention, the thickness of the thinnest portion may be smaller than that of the one side surface in the second part, and the thickness of the second part may vary between the one side surface and the thinnest portion.

In the liquid crystal display device according to another aspect of the invention, the plurality of light sources may be arranged on the one side surface or two side surfaces of the one side surface and the side surface opposite thereto and causes light to be incident on the light guide plate. Here, one portion of the plurality of light sources may be arranged on the one side surface or the one side surface and the side surface opposite thereto in the second part and supply light thereto, and another portion of the plurality of light sources may be arranged on at least one of the one side surface and the side surface opposite thereto in the first part and supply light thereto.

In the liquid crystal display device according to another aspect of the invention, the one side surface may be one of the top and bottom side surfaces of the light guide plate and is a side surface extending in the horizontal direction of the light guide plate. Here, the first part may include one of the left and right side surfaces of the light guide plate, and the length in the horizontal direction of the first part may be equal to or greater than 2.5% of the length in the horizontal direction of the one side surface.

In the liquid crystal display device according to another aspect of the invention, the plurality of parts may include at least two second parts, and one of the first part included in the plurality of parts may be disposed between two second parts.

In the liquid crystal display device according to another aspect of the invention, the plurality of light sources may be arranged on two side surfaces of the one side surface and the side surface opposite thereto and causes light to be incident on the light guide plate. Here, the one portion of the plurality of light sources may be arranged on the one side surface and the side surface opposite thereto in the second parts and supply light thereto. The second part may include a thinnest portion having the smallest thickness in the second part at a position separated away from the one side surface and the side surface opposite thereto, and the thickness of the second part may vary between the one side surface and the thinnest portion and between the side surface opposite thereto and the thinnest portion.

In the liquid crystal display device according to another aspect of the invention, a direction perpendicular to the extending direction of the plurality of parts may be a width direction of the plurality of parts, and the light intensity supplied to the first part from the other portion of the plurality of light sources per unit length in the width direction may be smaller than the light intensity supplied to the second part from the one portion of the plurality of light sources per unit length in the width direction.

In the liquid crystal display device according to another aspect of the invention, the first part and the second part may include scattering dots for reflecting light to emit the light from the emission surface on the rear surface opposite to the emission surface, and the scattering dots in the first part and the scattering dots in the second part may have at least one of different shapes and different density distributions.

In the liquid crystal display device according to another aspect of the invention, the first part may include a plurality of first light ejecting portions reflecting light to emit the light from the emission surface on the rear surface opposite to the emission surface, the second part may include a plurality of second light ejecting portions reflecting light to emit the light from the emission surface on the rear surface, and the first light ejecting portions and the second light ejecting portions may be formed on the rear surface by injection molding.

In the liquid crystal display device according to another aspect of the invention, the first part may include a plurality of first rear-surface shaped portions in addition to the plurality of first light ejecting portions, and the plurality of first light ejecting portions and the plurality of first rear-surface shaped portions may be alternately arranged on the rear surface. The second part may include a plurality of second rear-surface shaped portions in addition to the plurality of second light ejecting portions, and the plurality of second light ejecting portions and the plurality of second rear-surface shaped portions may be alternately arranged on the rear surface. Here, the plurality of first rear-surface shaped portions and the plurality of second rear-surface shaped portions may include a flat face parallel to the emission surface.

In the liquid crystal display device according to another aspect of the invention, the first part may include a plurality of first rear-surface shaped portions in addition to the plurality of first light ejecting portions, and the plurality of first light ejecting portions and the plurality of first rear-surface shaped portions may be alternately arranged on the rear surface. The second part may include a plurality of second rear-surface shaped portions in addition to the plurality of second light ejecting portions, and the plurality of second light ejecting portions and the plurality of second rear-surface shaped portions may be alternately arranged on the rear surface. Here, the second part may include a thinnest portion having the smallest thickness in the second part and the thickness of the second part may vary between the one side surface and the thinnest portion. One of the second light ejecting portions between the one side surface and the thinnest portion may form a step between the second rear-surface shaped portion adjacent to the one of the second light ejecting portions by arrangement on side where the one side surface is located and the second rear-surface shaped portion adjacent to the one of the second light ejecting portions by arrangement on side where the thinnest portion is located, and the rear surface in the second part may have a stepped shape between the one side surface and the thinnest portion.

In the liquid crystal display device according to another aspect of the invention, the first part may include a plurality of first rear-surface shaped portions in addition to the plurality of first light ejecting portions, and the plurality of first light ejecting portions and the plurality of first rear-surface shaped portions may be alternately arranged on the rear surface. The second part may include a plurality of second rear-surface shaped portions in addition to the plurality of second light ejecting portions, and the plurality of second light ejecting portions and the plurality of second rear-surface shaped portions may be alternately arranged on the rear surface. Here, the plurality of first light ejecting portions and the plurality of second light ejecting portions may be indented from two neighboring rear-surface shaped portions.

In the liquid crystal display device according to another aspect of the invention, the number of control faces in each first light ejecting portion may be equal to the number of control faces in each second light ejecting portion.

In the liquid crystal display device according to another aspect of the invention, the first part may have a portion with a constant thickness.

In the liquid crystal display device according to another aspect of the invention, the light guide plate may be an all-in-one molded product.

The liquid crystal display device according to another aspect of the invention may further include a chassis that receives the light guide plate, and the first part may include a fixing shape for fixing the light guide plate to the chassis.

In the liquid crystal display device according to another aspect of the invention, some of the plurality of light sources may be arranged on the one side surface in the second part, the second part may include an incidence portion causing light from the light sources to be incident on the one side surface, and some of the plurality of light sources may be arranged to face the incidence portion.

In the liquid crystal display device according to another aspect of the invention, the plurality of second light ejecting portions and the plurality of first light ejecting portions may have different shapes.

According to the above-mentioned configurations of the invention, it is possible to provide a liquid crystal display device in which the maintenance in strength and the decrease in weight stand together.

BRIEF DESCRIPTION OF THE DRAWINGS

FIG. 5A is a diagram illustrating a first modified example of the first embodiment.

FIG. 8C is an enlarged view of a portion, from which a ray (see FIG. 7B) is reflected, of the rear surface of the first part according to the second modified example of the second embodiment.

FIG. 8D is an enlarged view of a portion, from which a ray (see FIG. 7A) is reflected, of the rear surface of the second part according to a third modified example of the second embodiment.

FIG. 8E is an enlarged view of a portion, from which a ray (see FIG. 7B) is reflected, of the rear surface of the first part according to the third modified example of the second embodiment.

FIG. 9A is a sectional view in the right-and-left direction including a center $C_L$ which is the center in the top-and-bottom direction in a liquid crystal display device according to a third embodiment of the invention.

DETAILED DESCRIPTION OF THE INVENTION

Hereinafter, exemplary embodiments of the invention will be described in detail with reference to the accompanying drawings. The invention can be modified in various forms without departing from the technical concept of the invention.

First Embodiment

Figure 1:
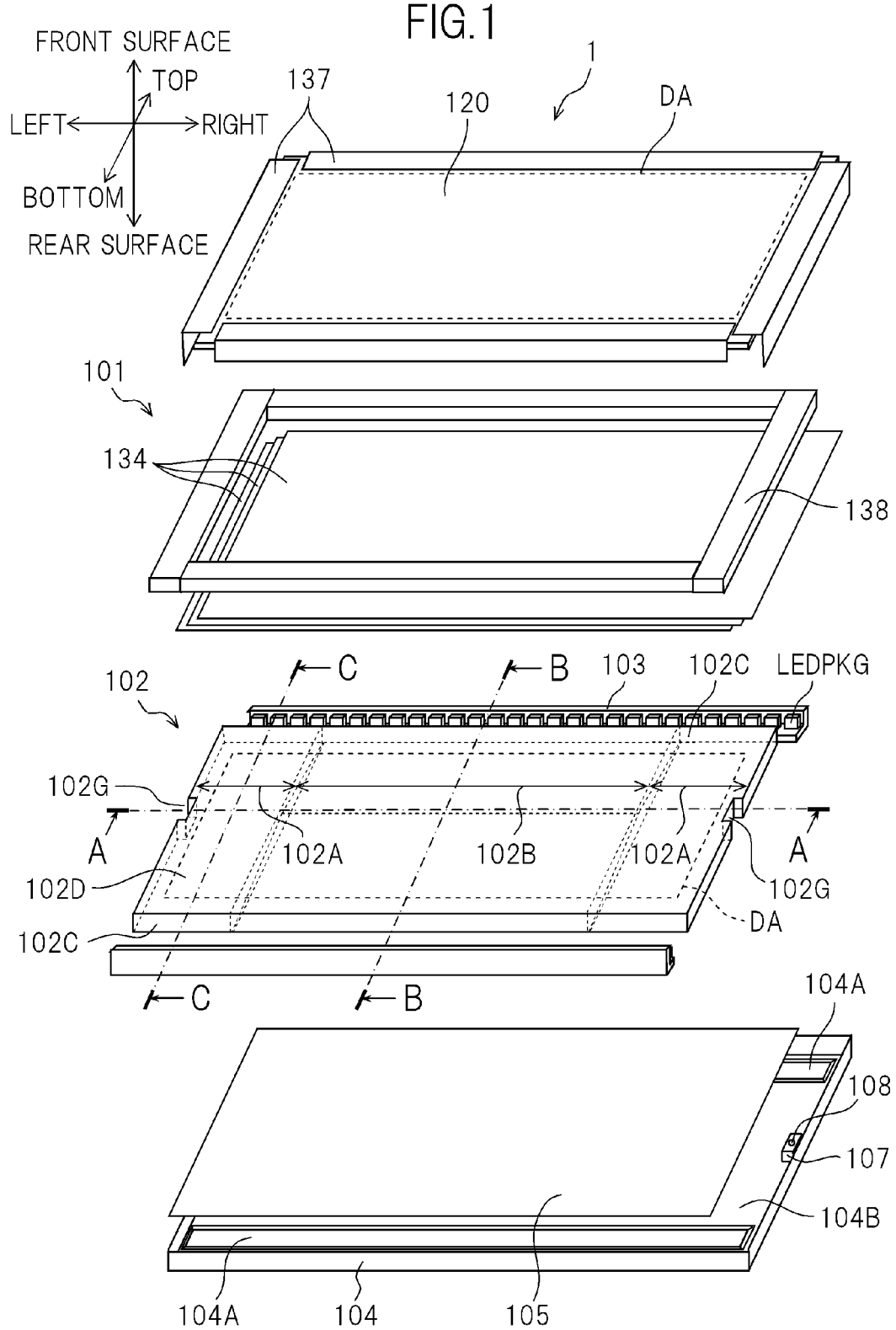
FIG. 1 is a perspective view illustrating a liquid crystal display device according to an embodiment of the invention.
Figure 2A:
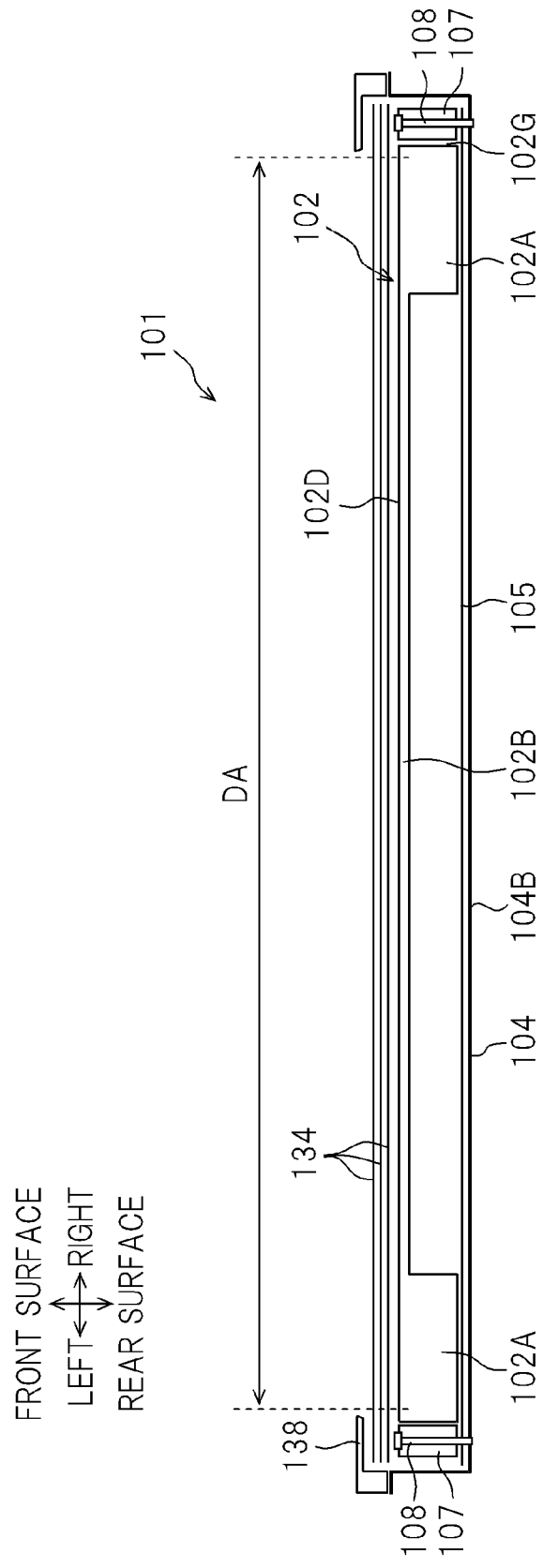
FIG. 2A is a sectional view taken along line A-A of FIG. 1.
Figure 2B:
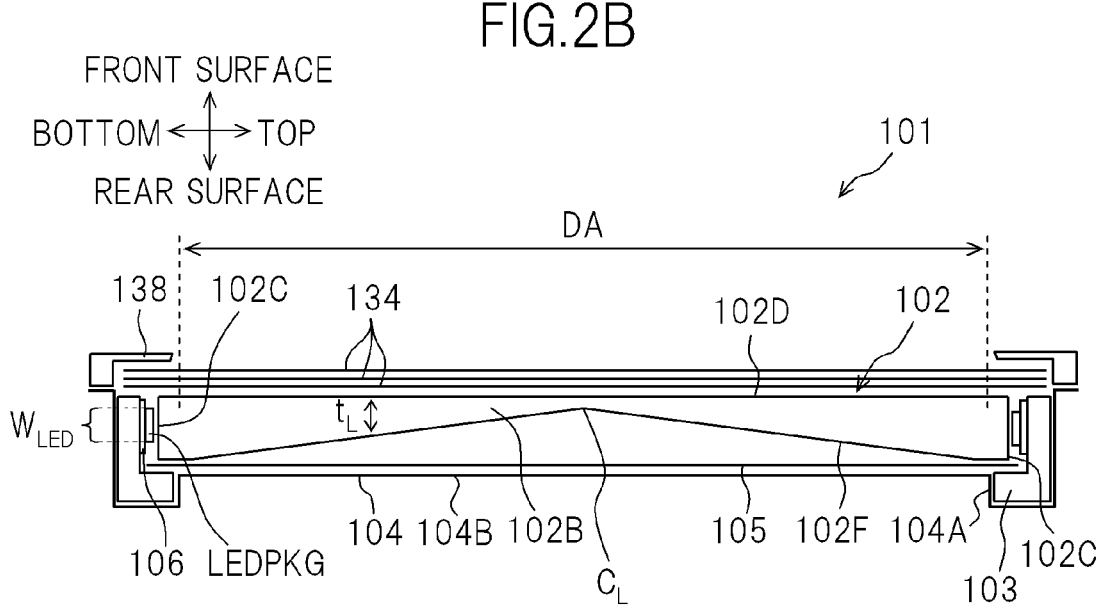
FIG. 2B is a sectional view taken along line B-B of FIG. 1.
Figure 2C:
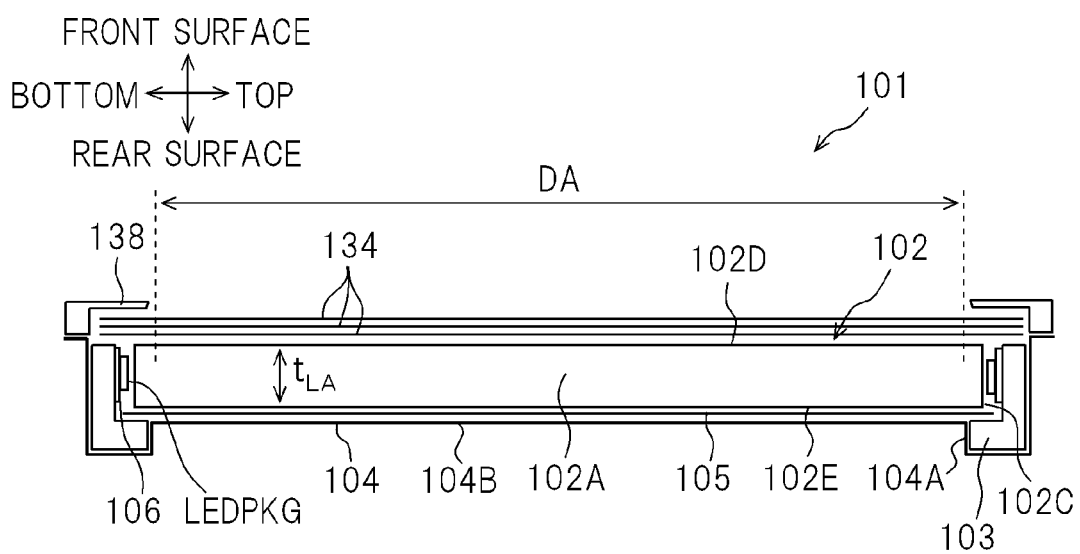
FIG. 2C is a sectional view taken along line C-C of FIG. 1.
Figure 3A:
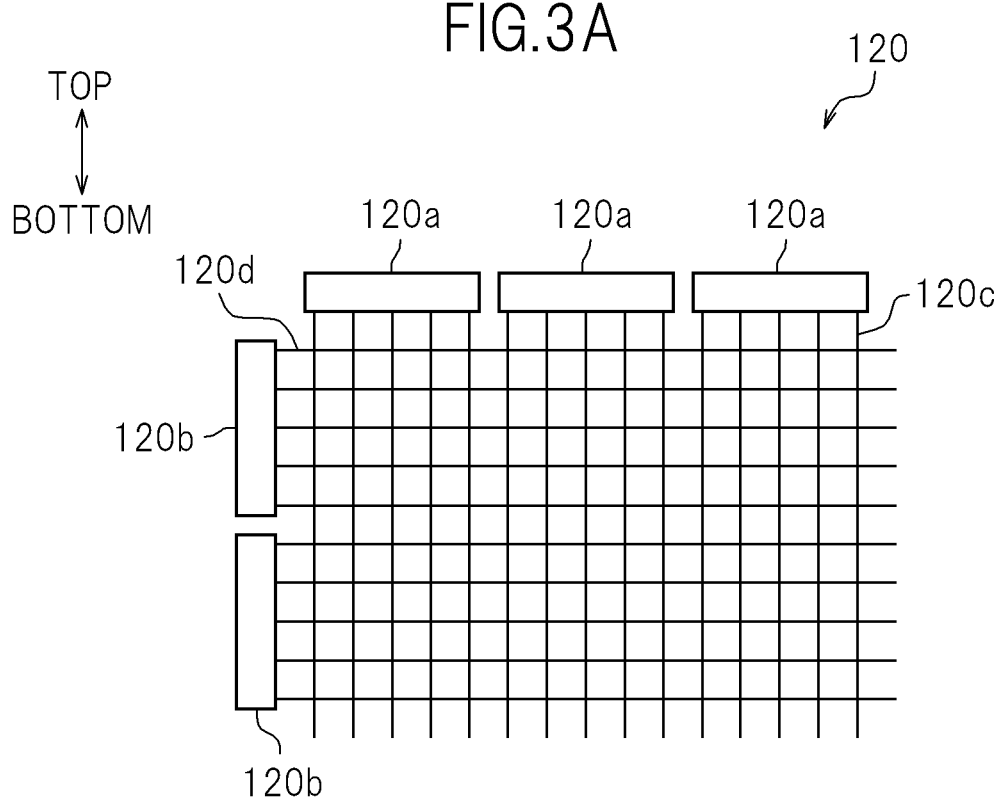
FIG. 3A is a diagram illustrating the arrangement of lines and driving circuits of a liquid crystal panel according to a first embodiment of the invention.
Figure 3B:
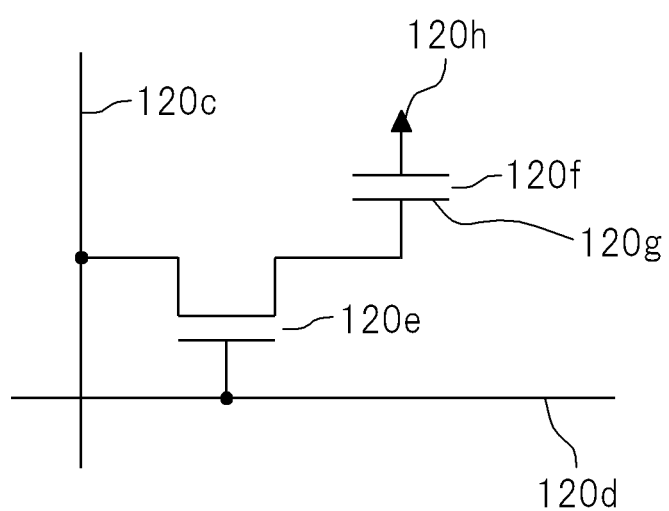
FIG. 3B is a diagram illustrating the arrangement of TFTs and a pixel electrode according to the first embodiment.

FIG. 1 is a perspective view illustrating a liquid crystal display device according to a first embodiment of the invention. FIGS. 2A to 2C are sectional views of a backlight 101 taken along lines A-A, B-B, and C-C of FIG. 1. FIG. 3A is a diagram illustrating arrangement of lines and driving circuits of a liquid crystal panel, and FIG. 3B is a diagram illustrating arrangement of thin film transistors (TFTs) and a pixel electrode according to the first embodiment. In this embodiment, as shown in FIG. 1, the top, bottom, left, right, front, and rear surfaces are defined with respect to a display screen of a liquid crystal panel 120. The right-and-left direction is a direction parallel to the long-axis direction of the liquid crystal panel 120 and the top-and-bottom direction is a direction parallel to the short-axis direction of the liquid crystal panel 120. In the following description, it is defined that a TV (the liquid crystal display device) is arranged in the actual use environment so that the front side is set as a side on which a viewer of the TV (the liquid crystal display device) is present and the top side is set as an upside.

FIGS. 1 to 3B are schematic diagrams and detailed configurations will therefore be described whenever necessary.

As shown in FIG. 1, the liquid crystal display device 1 according to this embodiment includes a liquid crystal panel 120 and a backlight 101. The liquid crystal panel 120 is fixed to the backlight with a top frame 137. The backlight 101 applies light to the liquid crystal panel 120 from the rear side thereof. The liquid crystal panel 120 displays a desired image on the front surface of the liquid crystal panel 120 by controlling transmittance of light applied from the backlight 101. In the front surface of the liquid crystal panel 120, an area for displaying an image by controlling the transmittance is referred to as a display area DA.

The backlight 101 includes a light guide plate 102 and an LED package LEDPKG mounted with one or more light emitting diodes (LED) as a light source. The LED package LEDPKG is fixed to a bottom frame 104 constituting a chassis for receiving the light guide plate 102 with a heat spreader 103 as a heat-dissipating member interposed therebetween. The light guide plate 102 is formed of a transparent resin such as acryl, includes plural side surfaces extending from an emission face 102D, and has a function of converting rays emitted from the LEDs (point light sources) into a surface light source.

The liquid crystal panel will be described below with reference to FIGS. 3A and 3B. The liquid crystal panel 120 has a configuration in which a liquid crystal is interposed between two glass boards and has a function of an optical shutter controlling the transmission and interception of light emitted from the light guide plate 102 by controlling the alignment states of liquid crystal molecules of the liquid crystal.

As shown in FIG. 3A, the liquid crystal panel 120 includes signal lines 120c and scanning lines 120d which are arranged in a lattice shape, a signal line driving circuit 120a driving the signal lines 120c, and a scanning line driving circuit 120b driving the scanning lines 120d.

As shown in FIG. 3B, a TFT 120e driving the liquid crystal 120f is connected to each lattice point of the signal lines 120c and the scanning lines 120d. When a positive voltage is applied to the corresponding scanning line 120d, the TFT 120e electrically connects the corresponding signal line 120c to a pixel electrode 120g. At this time, a voltage corresponding to image data is applied to the pixel electrode 120g from the signal line 120c, and the shutter of the liquid crystal 120f is opened or closed depending on the voltage between the pixel electrode 120g and a counter electrode 120h. When the shutter of the liquid crystal 120f is opened, the liquid crystal transmits the light emitted from the emission surface 102D of the light guide plate 102 shown in FIG. 1 to form a bright pixel. When the shutter of the liquid crystal 120f is not opened, the liquid crystal forms a dark pixel.

The relationship of the opening and closing of the shutter of the liquid crystal 120f and the voltage (≈the voltage between the pixel electrode 120g and the counter electrode 120h) applied to the liquid crystal depends on a so-called display mode of the liquid crystal 120f. In an example of the display mode of the liquid crystal panel 120 (see FIG. 1) dedicated to a general television receiver, a pixel becomes a bright pixel when the absolute value of the voltage applied to the liquid crystal 120f is great (about 5 V), and becomes a dark pixel when the absolute value of the voltage is small (about 0 V). At this time, with a voltage between 0 V and 5 V, the pixel nonlinearly becomes brighter as the absolute value of the voltage increases. By properly dividing the interval between 0 V and 5 V, it is possible to carry out a gray-scale display. Needless to say, the invention is not limited to the above display mode.

When a negative voltage is applied to the scanning line 120d connected to the TFT 120e, a high-resistance state is formed between the signal line 120c and the pixel electrode 120g and the voltage applied to the liquid crystal 120f is maintained.

In this way, the liquid crystal 120f is controlled by the voltages applied to the scanning line 120d and the signal line 120c.

The scanning line driving circuit 120b has a function of scanning the scanning lines with a constant period so as to apply a predetermined voltage to the respective scanning lines 120d, for example, sequentially from the top to the bottom. The signal line driving circuit 120a applies voltages corresponding to the pixels connected to the scanning line 120d, to which the predetermined voltage is applied by the scanning line driving circuit 120b, to the corresponding signal lines 120c.

According to this configuration, bright pixels and dark pixels are set up in the scanning line 120d to which the voltage is applied. By controlling the voltages applied to the signal lines 120c by the signal line driving circuit 120a with the scanning of the scanning line driving circuit 120b, it is possible to set up the bright pixels and the dark pixels in all the scanning lines 120d and thus to form an image on the liquid crystal panel 120.

The signal line driving circuit 120a and the scanning line driving circuit 120b may be controlled, for example, by a control device not shown.

Although not shown, the liquid crystal display device 1 includes a control device controlling the liquid crystal display device 1 or a driving unit including a DC/DC power source supplying a source voltage to the backlight 101. The control device is a device controlling the liquid crystal panel 120 or the backlight 101 or processing the image displayed by the liquid crystal display device 1, includes a computer having a CPU (Central Processing Unit), a RAM (Random Access Memory), and a ROM (Read Only Memory), programs, and peripheral circuits, and is driven by the program stored in the ROM.

For example, the control device has a function of controlling an image signal to be displayed on the liquid crystal panel 120 as light and shade information of the liquid crystal 120f (see FIG. 3B). The control device is configured to control the scanning line driving circuit 120b to scan the scanning lines sequentially from the top to the bottom so as to apply a predetermined voltage to each scanning line 120d and to control the signal line driving circuit 120a to applying predetermined voltages to the signal lines 120c on the basis of the light and shade information of the signal lines 120c in the scanning line 120d to which the predetermined voltage is applied.

In this embodiment, the heat spread 103 is received in a concave portion 104A of the bottom frame (see the sectional views of FIGS. 2B and 2C). The heat spreader 103 is formed of a material such as aluminum having a high thermal conductivity and serves to transmit heat generated in the LED package LEDPKG to an area of the bottom frame 104 as large as possible. As shown in the sectional views of FIGS. 2B and 2C, the section of the heat spreader 103 has an L shape and the front surface of the side extending in the top-and-bottom direction is located at the same position as the bottom-frame planar portion 104B in the front and rear surface direction. The front surface of the side extending in the top-and-bottom direction and the bottom-frame planar portion 104B form a plane substantially parallel to the liquid crystal panel 120. By disposing a reflecting sheet 105 reflecting light on the plane and disposing the light guide plate 102 thereon, the emission surface 102D which is the front surface of the light guide plate can be made to be parallel to the liquid crystal panel 120. In FIGS. 2B and 2C, the LED package LEDPKG is mounted on an LED package mounting board 106 (not shown in FIG. 1) and plural LED packages LEDPKG are connected on the LED package mounting board 106. An LED driving circuit (not shown) controls the LED packages LEDPKG as a whole or by groups. In this embodiment, the LED package mounting board 106 formed of aluminum is used, but it may be thought that an FPC (Flexible Printed Circuit) board is used or the LED package is mounted directly on the heat spreader 103. In the invention, the LED package mounting board 106 is not particularly limited.

Optical sheets 134 are an optical member controlling an angle distribution of light emitted from the light guide plate 102. An intermediate frame 138 is a structural member that fixes the optical sheets 134 and the light guide plate 102 to the bottom frame 104 and fixes the liquid crystal panel 120 to the top frame 137.

In FIG. 1, the rough position of the display area DA is indicated by a dotted line on the emission surface 102D of the light guide plate 102. In this embodiment, the display area DA is defined as a range in which there are pixels to be driven in the liquid crystal panel 120. The range in which there are pixels to be driven starts from a position separated by several mm to the inside (to the center of the liquid crystal panel 120) from an end of the intermediate frame 138 in the opening surrounded by the intermediate frame 138. The liquid crystal panel 120 is designed to move by several mm in all directions such as top, bottom, right and left in the display plane of the liquid crystal panel (so as to have a margin). Accordingly, the position of the display area DA also moves by several mm. However, the display area DA is not hidden from the front surface by the top frame 137. Therefore, the area surrounded by the top frame 137 of the liquid crystal panel 120 may be set as the display area DA, but the display area is defined as described above in this embodiment. When the length in the top-and-bottom direction of the range in which there are pixels to be driven is $W_{py}$ and the length in the right-and-left direction is $W_{px}$, the top end of the display area DA may be located at the position separated by $W_{py}/2$ upward from the center (the central position of the emission surface of the backlight 101) of the backlight 101, the bottom end of the display area DA may be located at the position separated downward by $W_{py}/2$, the right end of the display area DA may be located at the position separated by $W_{px}/2$ to the right, and the left end of the display area DA may be located at the position separated by $W_{px}/2$ to the left.

In this embodiment, plural LED packages LEDPKG are disposed on two side surfaces of the top and bottom of the light guide plate 102 and two side surfaces of the top and bottom of the light guide plate 102 serve as an incidence surface 102C. Light emitted from the LED packages LEDPKG is incident on the light guide plate 102 from the incidence surface 102C, is reflected by light ejecting means (which is not shown and of which the details will be described later) as means for ejecting light from the light guide plate 102, and is emitted from the emission surface 102D. The incidence surface 102C is an example of an incidence portion on which the light from the LED packages LEDPKG is incident and, for example, the incidence portion may be formed so that a part of the side surface serves as the incidence portion. Hereinafter, the emission of light, which is being guided in the light guide plate 102, from the emission surface 102D due to the light ejecting means may be referred to as "light ejection" in this embodiment.

The light guide plate 102 is partitioned into plural parts in the right-and-left direction (horizontal direction) which is the long-axis direction of the liquid crystal panel 120. The plural parts extend in the light incidence direction from one side surface (bottom side surface) of the light guide plate 102 on which the LED packages LEDPKG are arranged to the opposite side surface (the top side surface), and each thereof forms a part of the light guide plate 102. Each of the plural parts extends in the direction perpendicular to the top side surface or the bottom side surface of the light guide plate 102 and the light from the incidence surface 102C is incident in the perpendicular direction (strictly, the pointing vector of the incident ray has a component in the perpendicular direction). The light guide plate 102 in this embodiment is divided into two first parts 102A and one second part 102B (specifically, see the sectional view taken along line A-A parallel to the right-and-left direction in FIG. 2A), and the thickness $t_L$ (hereinafter, simply referred to as a thickness $t_L$ or a plate thickness $t_L$) of the second part 102B in the normal direction (the front direction) of the liquid crystal panel varies depending on the position in the top-and-bottom direction (specifically, see the sectional view taken along line B-B parallel to the top-and-bottom direction in FIG. 2B).

In this embodiment, the sectional shapes in the top-and-bottom direction of the first parts 102A and the second part 102B are different from each other and the thickness of the first parts 102A does not depend on the position but is substantially constant. The thickest portion of the light guide plate 102 is the first parts 102A. The incidence surface 102C has a constant thickness in the right-and-left direction and has a thickness equal to the thickness of the first parts 102A. The reason for setting the incidence surface 102C to the thickest is that the light emitted from the LED packages LEDPKG is efficiently incident on the light guide plate 102.

It is preferable that the total length in the right-and-left direction of the two first parts 102A is 5% to 50% of the length in the right-and-left direction of the light guide plate 102 (Since two first parts 102A are located at the right and left ends in FIG. 1, the length in the right-and-left direction of each first part 102A is preferably 2.5 to 25% of the length in the right-and-left direction of the light guide plate 102). For example, when the total length in the right-and-left direction of the first parts 102A is 20% of the length in the right-and-left direction of the light guide plate 102, the weight can be reduced by 30%. In view of both the decrease in weight and the maintenance in strength, it is more preferable that the total length in the right-and-left direction of the two first parts 102A is 10% to 20% of the length in the right-and-left direction of the light guide plate 102.

The sectional shape of the second part 102B will be described below with reference to FIG. 2B. In FIG. 2B, the thickness $t_L$ of the light guide plate in the incidence surface 102C is greater than the width $W_{LED}$ of the LED so that the light emitted from the LED package LEDPKG can be efficiently incident on the light guide plate 102. When the thickness $t_L$ of the incidence surface 102C is smaller than the width $W_{LED}$ of the LED, a part of the light emitted from the LED package is not incident on the light guide plate 102. The part of the light not incident on the light guide plate is lost as stray light or causes a bright line at the top and bottom ends of the liquid crystal panel 120.

Here, the second part 102B has a thinnest portion having the smallest thickness in the second part 102B. The thinnest portion is thinner than one side surface (which is described below using the bottom side surface as the one side surface in this embodiment) in which plural light sources are arranged to input light. In this embodiment, the thinnest portion is located at the center $C_L$ of the light guide plate 102 and the thickness varies from the bottom side surface to the center $C_L$. Specifically, as it recedes from the incidence surface 102C formed in the second part 102B, the thickness decreases. As shown in FIG. 2B, the thickness $t_L$ of the light guide plate in this embodiment decreases toward the center $C_L$ of the light guide plate in the top-and-bottom direction. This is because the weight of the light guide plate can be reduced by reducing the thickness $t_L$.

The sectional shape of the first parts 102A will be described below with reference to FIG. 2C. As shown in FIGS. 2B and 2C, the sectional shape in the top-and-bottom direction which is the extending direction of the first parts 102A and the second part 102B is different between the first parts 102A and the second part 102B. As shown in FIGS. 2B and 2C, the sectional area of the first part 102A is greater than the sectional area of the second part 102B. As shown in FIGS. 2B and 2C, the sectional area in the top-and-bottom direction of the first part 102A is greater, even when the portion of the first part 102A two-dimensionally overlapping with the display area DA is compared with the portion of the second part 102B two-dimensionally overlapping with the display area DA. The second part 102B of which the weight decreases due to the thinnest portion is reinforced by the adjacent first parts 102A. In this embodiment, the thickness $t_{LA}$ of the first parts 102A does not depend on the position but is constant. The thickness $t_{LA}$ of the first parts 102A is constant in the entire range in the top-and-bottom direction of the display area DA. The reason for setting the thickness $t_{LA}$ of the first parts 102A to be constant is that the strength of the light guide plate 102 can be improved.

For example, as in the related art, when the central portion in the top-and-bottom direction is thinner in the sectional shape in the top-and-bottom direction of the light guide plate and the sectional shape does not depend on the position in the right-and-left direction but is constant (when the light guide plate shown in FIG. 1 includes only the second part 102B but does not include the second part 102A), the strength of the thinnest portion (the center $C_L$ of the light guide plate in the top-and-bottom direction in FIG. 2B) decreases. For example, in case of a large-sized liquid crystal display device with a size of 26 inches or more or particularly with a size of 32 inches or more, warp or break may be caused and the warp in the front and rear surface directions increases as the size increases. Particularly, when the section in the top-and-bottom direction of the light guide plate 102 has the thinnest portion at the center $C_L$ as shown in FIG. 2B, the weight of the light guide plate above the thinnest portion (the center $C_L$) acts on the thinnest portion (the center $C_L$), which can be easily broken. When the liquid crystal display device is carried from a manufacturing fabrication by car or ship, it can be thought that break or crack may be caused due to vibration. When the liquid crystal display device is heavily packed so as to suppress the break or crack, the amount of packing material increases, thereby increasing the environmental load.

Here, when the first part 102A has a predetermined width in the right-and-left direction and a portion (adjacent portion) adjacent to the thinnest portion is thicker than the thinnest portion, it is possible to suppress the decrease in strength of the light guide plate 102 due to the thinnest portion. Specifically, the thickness of the adjacent portion can be set to be greater than the average thickness of the second part 102B. Here, by setting the range where the first part 102A is thicker than the second part 102B to a range including the portion extending from the position (a position separated by a half of a predetermined distance from the one side surface when the distance between the one side surface and the thinnest portion is used as the predetermined distance) which is a middle between the thinnest portion and the one side surface to the thinnest portion, it is possible to further suppress the decrease in strength. It is preferable that the thickness in the top-and-bottom direction of the first part 102A is constant in a predetermined range including the adjacent portion and the first part 102A is thicker than the second part 102B, as in this embodiment.

It is preferable that the thickness of the thinnest portion is set to ¾ or less and ⅛ or more of the thickness of the second part 102B in the bottom side surface for the purpose of the consistency of the decrease in weight with the strength of the light guide plate 102.

In this embodiment, it is possible to guarantee the strength by increasing the length of the first part 102A in the horizontal direction (specifically, setting the length to 2.5% or more of the length of the light guide plate 102 in the horizontal direction (long-axis direction)) so as to two-dimensionally overlap the first part 102A with the display area DA. For example, the entire area of the display area DA may be included in the second part 102B and the first part 102A can be guaranteed widely, by increasing the length of the light guide plate 102 in the right-and-left direction. However, in this case, since the frame in the right-and-left direction of the TV mounted with the liquid crystal display device is enlarged, it is preferable that the first part 102A is made to overlap with the display area DA as in this embodiment. In this embodiment, a part (the first part 102A) of the light guide plate 102 overlapping with the display area DA is used as a part of the surface light source and is also used as a reinforcing member.

Since the first part 102A overlaps with the display area DA, light has to be emitted from the emission surface 102D. Therefore, light ejecting means are provided to the first part 102A, and the first part 102A and the second part 102B have a shape for guiding the light incident on the light guide plate 102 and emitting the light from the emission surface 102D. In this embodiment, the light ejecting means of the first part 102A is provided to correspond to the display area DA. The light ejecting means are disposed from the position separated by several mm from the outer edge surrounding the display area DA to the inner area thereof. In the configuration according to this embodiment, the light ejecting means is provided to both the first part 102A and the second part 102B.

In this embodiment, since the first part 102A also guides the light, the first part 102A as well as the second part 102B should also be transparent so as to guide light. In this embodiment, since light is emitted from the emission surface 102D of the first part 102A, the LEDs as a light source should be disposed at a position opposite to the incidence surface 102C of the first part 102A. Since the first part 102A is thicker in the top-and-bottom direction and more easily guides light than the second part 102B, the light intensity supplied from the top and bottom side surfaces of the first part 102A may be smaller than that of the second part 102B including the central portion in the right-and-left direction. In addition, when the brightness as a backlight is not required for the right and left ends of the display area DA in comparison with the center of the display area DA, the intensity of light emitted from the first part 102A can be small by disposing the first part 102A at the right and left ends. Therefore, the density of the LED packages LEDPKG corresponding to the first part 102A per unit length in the right-and-left direction can be lower than the density of the LED packages LEDPKG corresponding to the second part 102B per unit length in the right-and-left direction. Specifically, when the direction perpendicular to the extending direction of the plural parts is set as the width direction, the light intensity supplied, which is supplied from the light sources disposed on two side surfaces of the first part 102A, per unit length in the width direction of the first part 102A can be smaller than the light intensity, which is supplied from the light sources disposed on two side surfaces of the second part 102B, per unit length in the width direction of the second part 102B.

Since light is also guided by the first part 102A, the incidence surface 102C of the first part 102A is processed into a mirror surface, similarly to the incidence surface 102C of the second part 102B. When the incidence surface 102C is not processed in a mirror surface, the incident light is not guided but is emitted right from the light guide plate 102.

It is preferable that the light guide plate 102 according to this embodiment is an all-in-one molded product having not connecting portion by injection molding. Light is guided between the first part 102A and the second part 102B, but when a material such as an adhesive having a large refractive index exists at the boundary between the first part 102A and the second part 102B, the light is scattered at the boundary and is emitted from the light guide plate 102, whereby a bright line corresponding to the boundary is generated on the liquid crystal panel. When the parts are attached to each other with an adhesive, the parts may be detached and thus the all-in-one molding may be preferably used.

As shown in the sectional shape of the second part 102B of FIG. 2B, the rear surface 102F is obliquely formed in a straight line shape up to the thinnest portion, but the rear surface is not to this shape. As it goes toward the thinnest portion, the rear surface 102F of the second part 102B may be formed in a curved shape so that the thickness of the second part 102B decreases, or may be formed in a stepped shape so that the thickness decreases. The shape of the rear surface is not particularly limited as long as it can reduce the weight of the light guide plate. The plate thickness $t_L$ does not necessarily monotonously decrease. Various shapes can be employed in consideration of the optical design.

The thickness $t_L$ of the second part 102B can be set to be equal to or less than the thickness $t_{LA}$ of the first part 102A, so as to arrange the reflecting sheet 105 and the rear surface 102E of the first part 102A to be parallel to each other and to arrange the emission surface 102D and the liquid crystal panel 120 to be substantially parallel to each other. That is, by using the plane (the rear surface 102E of the first part 102A) disposed in the light guide plate and the plane of the reflecting sheet 105, the emission surface 102D and the liquid crystal panel 120 are made to be parallel to each other and the incidence surface 102C and the light-emitting surface of the LED package LEDPKG are made to substantially parallel to each other. When the positional relationship between the LED package LEDPKG and the incidence surface 102C varies, the light intensity incident on the light guide plate 102 from the LED package LEDPKG can be reduced, thereby lowering the incidence efficiency. Therefore, it is possible to suppress the decrease in incidence efficiency, by fixing the positional relationship between the LED package LEDPKG and the incidence surface 102C using the plane (the rear surface 102E of the first part 102A) disposed in the light guide plate and the plane of the reflecting sheet 105.

The first part 102A has a fixing shape 102G for fixing the position of the light guide plate 102. In this embodiment, the fixing shape is notches formed at the right and left ends (see FIG. 1). When the light guide plate 102 is disposed in the bottom frame 104 forming a chassis, fixing blocks 107 are inserted into the notches to fix the light guide plate 102 to the chassis. The fixing blocks 107 are screwed to the bottom frame 104 with fixing screws 108. It is preferable that the fixing shape 102G is disposed at a position except for the center $C_L$ (the thinnest portion) which can be easily broken due to an applied force. By providing the first part 102A, the fixing shape 102G can be disposed at predetermined positions in the top-and-bottom direction at the right and left ends of the light guide plate 102. In this embodiment, the notch is used as the fixing shape 102G, but the fixing shape is not limited to this configuration and is not particularly limited as long as it can fix the positional relationship between the bottom frame 104 and the light guide plate 102. The light guide plate can be fixed to the bottom frame, for example, by forming a round hole in the light guide plate 102 and inserting a pin coupled to the bottom frame 104 into the round hole. This fixing shape 102G is necessary for a large-sized liquid crystal display device. This is because the thermal expansion of the light guide plate 102 increases as the size increases.

As described above, by providing the first part 102A which is optically transparent and can guide light, the first part 102A can be made to overlap with the display area DA, whereby it is possible to suppress the increase in frame size and to suppress the decrease in strength of the light guide plate due to the decrease in thickness of the second part 102B.

Since the first part 102A serves to fix the position of the light guide plate 102 and the first part 102A is located at the right and left ends of the light guide plate 102, it is possible to form the fixing shape 102G at predetermined positions in the top-and-bottom direction of the right and left ends.

Figure 4A:
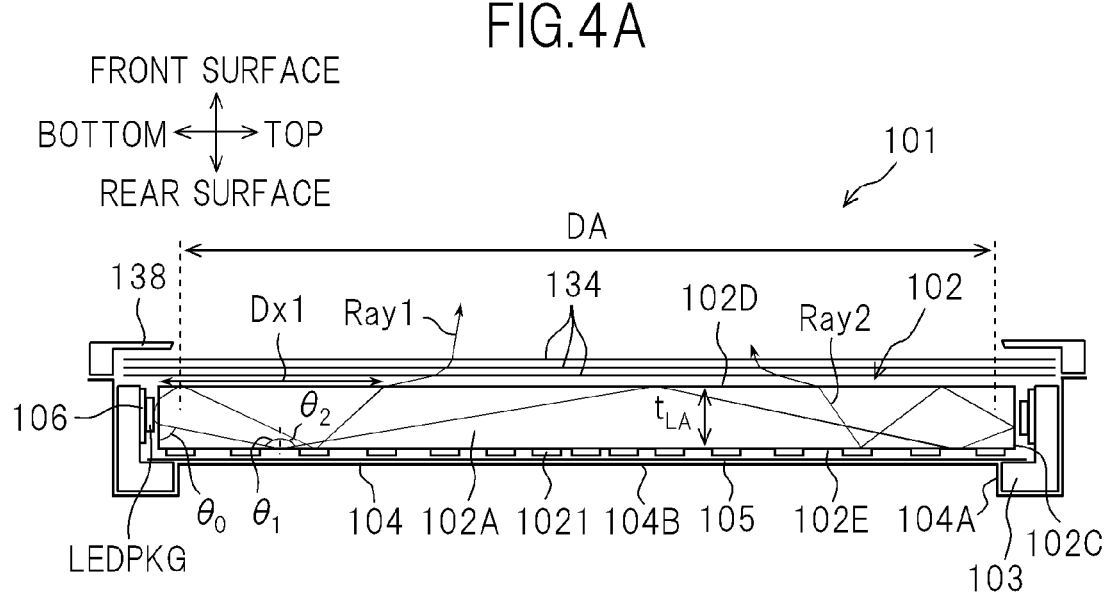
FIG. 4A is a diagram illustrating a ray tracing example of a first part when the light ejecting means is scattering dots in the first embodiment.

The light ejecting means in the first part 102A and the second part 102B will be described below. FIGS. 4A and 4C illustrate ray tracing examples in the first part 102A and the second part 102B when the light ejecting means employs scattering dots 1021. Rays Ray1 and Ray2 propagating in the sections are shown. For the purpose of simple explanation, the distance between the incidence surface 102C on which the ray Ray1 is incident and the emission position on the emission surface 102D is referred to as an emission distance Dx1 in FIGS. 4A and 4C. The emission distance Dx1 indicates the shortest distance between the incidence surface 102C and the emission position as a point. An emission distance Dx2 (not shown) is defined for the ray Ray2.

Figure 4B:
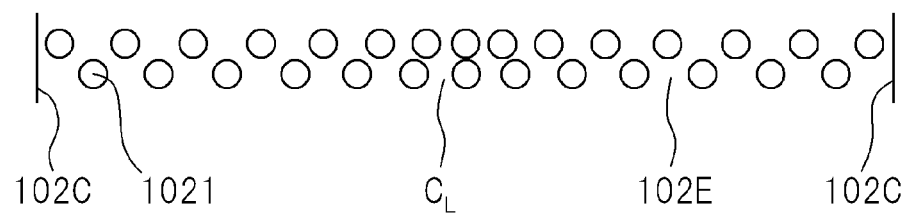
FIG. 4B is a schematic diagram illustrating the arrangement of the scattering dots when viewed from the rear surface side when the scattering dots are disposed on the rear surface of the first part.
Figure 4C:
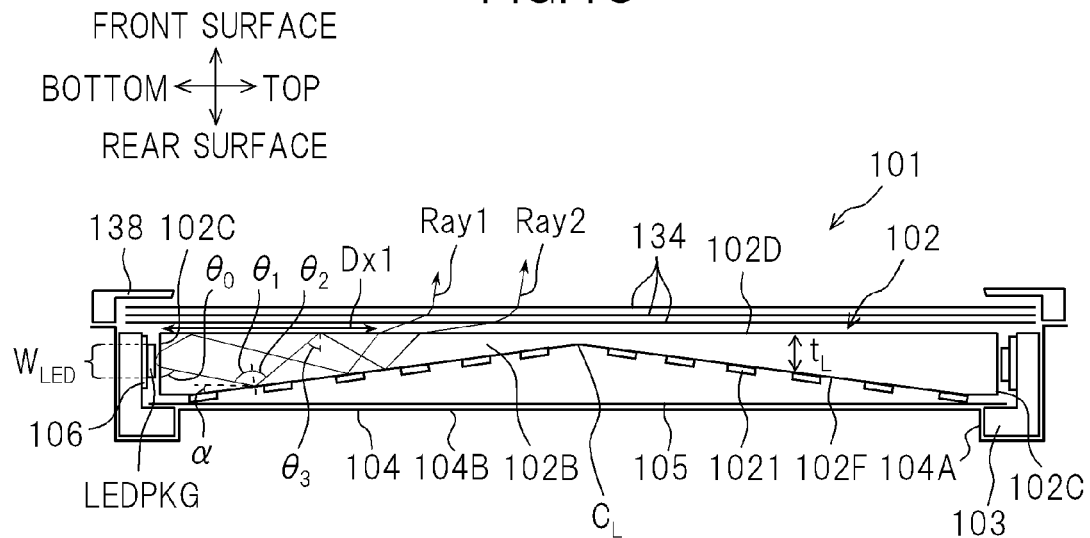
FIG. 4C is a diagram illustrating a ray tracing example of a second part when the light ejecting means is scattering dots in the first embodiment.
Figure 4D:
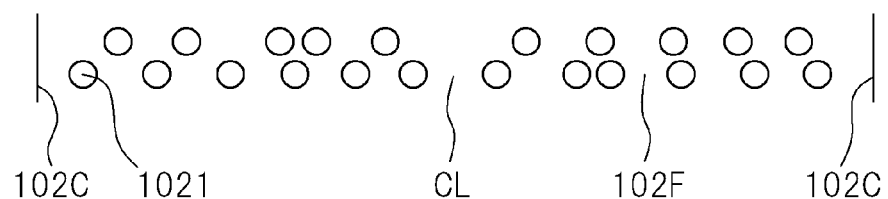
FIG. 4D is a schematic diagram illustrating the arrangement of the scattering dots as viewed from the rear surface side when the scattering dots are disposed on the rear surface of the second part.

FIGS. 4B and 4D are schematic diagrams illustrating the scattering dots 1021 formed on the rear surface 102E of the first part 102A and the rear surface 102F of the second part 102B as viewed from the rear side.

The light incident on the first part 102A is mainly emitted from the light guide plate 102 in any of an optical path where the light is scattered by the scattering dots 1021 and emitted from the light guide plate 102 and an optical path where the light is emitted from the light guide plate 102 in accordance with the Fresnel's transmittance and reflectance in an incidence surface opposite to the incidence surface. In general, by adjusting the density of the scattering dots 1021, it is designed that the incident light is scattered by the scattering dots 1021 and emitted from the emission surface 102D until the incident light reaches the incidence surface opposite to the incidence surface on which the light is incident.

In the schematic example shown in FIG. 4A, the ray Ray1 is scattered by the scattering dots 1021 and emitted from the emission surface 102D before reaching the incidence surface (the top incidence surface 102C) opposite to the incidence surface of the ray Ray1, the traveling direction of the ray is changed by the optical sheets 134, and the light is emitted to the liquid crystal panel 120. A combination of a diffusion sheet (a sheet diffusing and collecting light), a prism sheet (a sheet of which the front surface is provided with micro triangular prisms), and a polarization reflecting sheet (a sheet having higher transmittance for specific polarized light) from the light guide plate side can be considered as the optical sheet 134, but the invention is not limited to this combination. In the example shown in FIG. 4A, the ray Ray2 is reflected by the incidence surface (the top incidence surface 102C) opposite to the incidence surface of the ray Ray2 in accordance with the Fresnel's transmittance and reflectance, is scattered by the scattering dots 1021 in the course of returning, and is emitted from the emission surface 102D. A part of the light reaching the incidence surface (the top incidence surface 102C) opposite to the incidence surface of the light is reflected in accordance with the Fresnel's transmittance and reflectance like the ray Ray2 and is guided again in the light guide plate 102, and the other of the light is transmitted and emitted from the light guide plate 102. The light emitted from the opposite incidence surface 102C is reflected and lost by the LED package LEDPKG or the LED package mounting board 106. A part of the reflected light is incident on the light guide plate 102 again and serves as effective light contributing to the illumination of the liquid crystal panel 120, but the other light serves as the loss of the backlight optical system. Therefore, since the light is emitted from the emission surface 102D by the scattering dots 1021 until the light reaches the incidence surface opposite to the incidence surface of the light, it is possible to suppress the loss of the backlight optical system. FIG. 4B illustrates an example of the scattering dots 1021 formed on the rear surface 102E of the first part 102A. The scattering dots 1021 are white printed matters and are circular in this embodiment, and the rear-surface of the light guide plate 102 has a shape which the light from the light incidence surface 102C is scattered by the scattering dots 1021. As it goes from the incidence surface 102C to the center $C_L$, the density of the scattering dots 1021 increases. In the vicinity of the center $C_L$, most of the light is scattered by the scattering dots 1021 disposed from the vicinity of the incidence surface 102C to the center $C_L$ until reaching the vicinity of the center $C_L$ and thus probability that the light reaches the scattering dots in the vicinity of the center $C_L$ is low. Accordingly, to homogenize the light intensity emitted from the backlight 101 in the plane, the density of the scattering dots 1021 in the vicinity of the center $C_L$ is set to be greater than that in the vicinity of the incidence surface 102C.

A ray tracing example of the second part 102B will be described below with reference to FIG. 4C. The configurations such as the optical sheet 134 of which the description overlaps with that of the first part 102A are not described. It is assumed that the sectional shape of the rear surface 102F of the second part 102B is inclined with a slope of α.

In this example, the ray Ray1 is scattered by the scattering dots 1021 and is emitted from the emission surface 102D. When the ray Ray2 is reflected by the rear surface 102F of the second part 102B, the angle $\theta_3$ between the ray Ray2 and the normal line of the emission surface 102D gets close to a threshold angle $\theta_c$ ($=\sin^{-1}(n_{air}/n_L)$), where $n_{air}$ represents the refractive index of air (or the refractive index of a material in contact with the emission surface) and $n_L$ represents the refractive index of the light guide plate 102) and the ray is emitted from the emission surface 102D in accordance with the Fresnel's transmittance and reflectance. A difference from the light ejecting mechanism of the first part 102A is that the rear surface has a slope face and thus the reflection of light from the rear surface 102F of the second part 102B is repeated to emit the light from the emission surface 102D even when the ray does not come in contact with the scattering dots (hereinafter, the light ejecting mechanism emitting light under the collapsed total reflection condition due to the slope (including a curve) as described above is referred to as an inclined light ejecting mechanism for the purpose of simple explanation. The inclined light ejecting mechanism is considered one of the light ejecting means, and thus the light ejection by the inclined light ejecting mechanism may be referred to as inclined light ejecting means). As the angle α increases, the angle $\theta_3$ becomes smaller than the threshold angle $\theta_c$ with the smaller number of reflections and the light is emitted from the emission surface 102D at a position not away from the incidence surface 102C. In the sectional shape shown in FIG. 4C, the intensity of the emitted light by the inclined light ejecting mechanism is the maximum at the center $C_L$ having the smallest thickness $t_L$. Therefore, to set the emitted light intensity distributions of the first part 102A and the second part 102B to the same and thus to prepare a liquid crystal display device having no deviation in the entire display surface of the liquid crystal panel, the position distribution of the scattering dots 1021 of the second part 102B needs to be set in consideration of the intensity of the emitted light by the inclined light ejecting mechanism.

Therefore, the position distributions (density distributions) of the scattering dots in the first part 102A and the second part 102B are set to be different from each other, thereby suppressing the deviation.

The density of the scattering dots of the first part 102A increases as it goes away from the incidence surface 102C (see FIG. 4B), but the scattering dots of the second part 102B are distributed in consideration of the slope of the rear surface 102F of the second part 102B and thus have a distribution different from the distribution in the first part 102A. Although it also depends on the slope of the rear surface 102F, a position having the maximum density exists in the distance range of $\frac{1}{2}L_x$ to $\frac{3}{4}L_x$ toward the center $C_L$ from the incidence surface 102C, where $L_x$ represents the distance between the incidence surface 102C and the center $C_L$ as the thinnest portion.

Here, the density of the scattering dots is described as a number density when the size of the dots is constant, but the invention is not limited to this configuration. More strictly, the density of the scattering dots is thought as a print area of white ink, which is a material of the scattering dots, per unit area. For example, by controlling the circular radius of the scattering dots, the print area per unit area may be controlled, thereby controlling the density. The density of the scattering dots may be similarly controlled by controlling the concentration of white ink. The high concentration of white ink corresponds to the high density and the low concentration of white link corresponds to the low density.

The density distributions of the scattering dots in the first part 102A and the second part 102B may be different from each other and the shapes may also be different from each other. For example, the shape of the scattering dots in the first part 102A may be set to be circular and the shape of the scattering dots in the second part 102B may be set to be elliptical. The positional control of the size of the scattering dots may be a shape control or a density control.

By individually controlling the shapes or densities of the scattering dots in the first part 102A and the second part 102B, it is possible to construct a liquid crystal display device having less deviation in the entire display surface of the liquid crystal panel.

Although it has been described in this embodiment that the shape of the rear surface 102F of the second part 102B is set to a straight line-shaped slope shown in FIG. 4C, the invention is not limited and the rear surface may have a curved line shape, a bent line shape, or a stepped shape.

Modified Examples

Figure 5B:
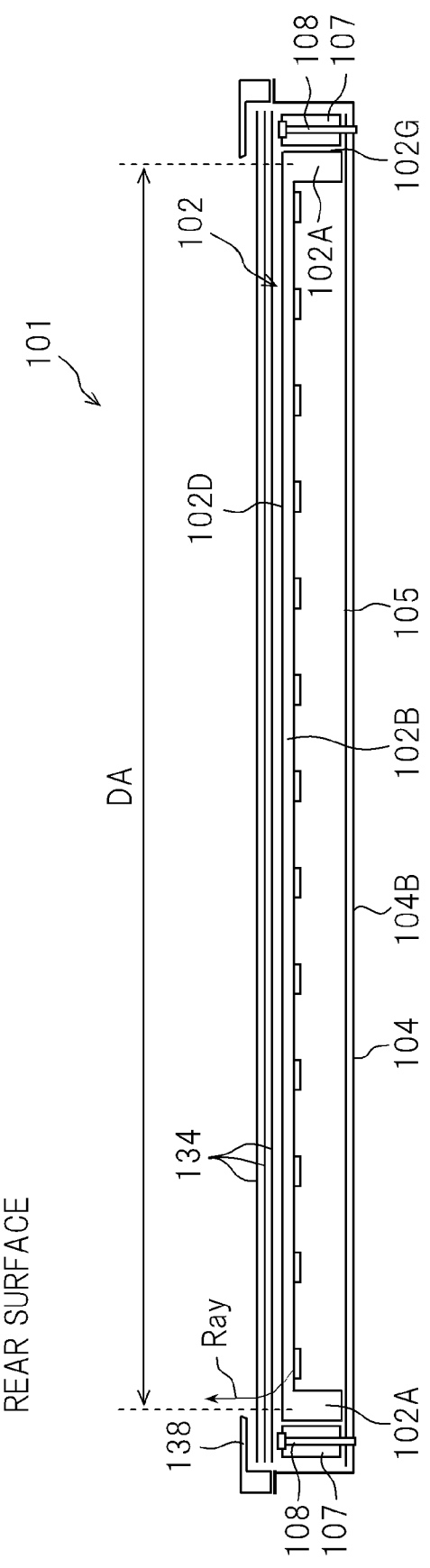
FIG. 5B is a diagram illustrating a second modified example of the first embodiment.

Modified examples of the first embodiment of the invention will be described with reference to FIGS. 5A to 5C. FIG. 5A is a diagram illustrating a first modified example of the first embodiment. In this example, the scattering dots are formed in only the first part 102A, the second part 102B is formed in a curved shape, and the light ejecting means of the second part 102B is not the scattering dots but the inclined light ejecting mechanism using the curved shape. Since the schematic diagram of the first part 102A is the same as shown in FIG. 4A, only the section in the top-and-bottom direction of the second part 102B is shown in the modified example shown in FIG. 5A.

In the first modified example shown in FIG. 5A, a liquid crystal display device having no deviation in the entire display surface of the liquid crystal panel is constructed by controlling a scattering dot position distribution (density and shape distributions) of the first part 102A and the curved shape of the second part 102B. The shape of the rear surface 102F of the second part 102B is not limited to the curve, and may be a straight line shape, a bent shape, or a stepped shape shown in FIG. 4C. In this modified example, the first part 102A and the second part 102B have different light ejecting means.

FIG. 5B is a diagram illustrating a second modified example of the first embodiment. In this modified example, the first part 102A is much smaller than the second part 102B, light is emitted from the first part 102A by the use of the light ejecting means of the second part 102B, and the light ejecting means is not disposed in the first part 102A. Therefore, in this case, the first part 102A has a function of guiding the light incident on the light guide plate 102 but not emitting the light from the emission surface 102D. FIG. 5B is a sectional view of the liquid crystal display device 1 in the right-and-left direction (see line A-A of FIG. 1). In this case, the light sources are arranged to correspond to the second part 102B. The ray Ray is emitted from the display area DA corresponding to the first part 102A to the liquid crystal panel by the light ejecting means of the second part 102B. In the second modified example shown in FIG. 5B, the scattering dots 1201 are used as the light ejecting means, but the invention is not limited to this configuration and micro shapes (the details of which are described later) or the inclined light ejecting mechanism may be used.

Figure 5C:
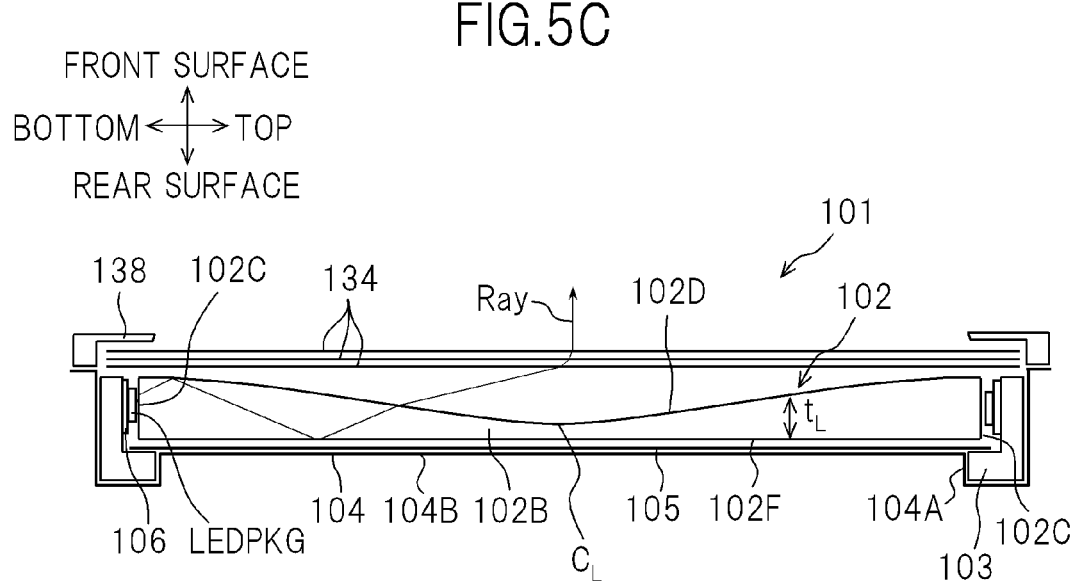
FIG. 5C is a diagram illustrating a third modified example of the first embodiment.

FIG. 5C illustrates a third modified example where the side of the second part 102B facing the liquid crystal panel is concaved and is a sectional view (see line B-B of FIG. 1) of the liquid crystal display device 1 in the top-and-bottom direction (in which the light guide plate in FIG. 5A is inverted from front to rear). The ray tracing example of the ray Ray is also illustrated. In the third modified example shown in FIG. 5C, the schematic diagram of the first part 102A is the same as shown in FIG. 4A and thus only the section of the second part 102B in the top-and-bottom direction is shown. As a result, since the rear surface of the light guide plate 102 (the rear surface of the light guide plate 102 includes the rear surface 102E of the first part 102A and the rear surface 102F of the second part 102B) is disposed to be parallel to the entire surface of the reflecting sheet 105, the fixation can be simplified. Since the positional relationship between the LED package LEDPKG and the incidence surface 102C can be fixed using the plane, it is possible to suppress the decrease in incidence efficiency.

In the first embodiment, the emission surface 102D of the light guide plate 102 is formed in a planar shape (see FIG. 2B and the like) and the rear surface 102F is concaved with respect to the first part 102A. On the contrary, in the third modified example, the rear surface 102F of the light guide plate 102 is formed in a planar shape (see FIG. 5C) and the emission surface 102D is concaved with respect to the first part 102A.

In the first embodiment, the light sources are arranged on two side surfaces of the top and bottom side surfaces of the light guide plate 102, but the light sources may be arranged on two side surfaces of the right and left side surfaces and the light guide plate 102 may include the first part 102A and the second part 102B extending in the horizontal direction. In this case, it is possible to cause the maintenance in strength and the decrease in weight of the light guide plate 102 to stand together.

In the first embodiment, the center $C_L$ of the light guide plate 102 is the thinnest portion and the thickness varies in two areas between the center $C_L$ and the top side surface and between the center $C_L$ and the bottom side surface. In the first embodiment, the thinnest portion is located at the center $C_L$ of the light guide plate 102, but the thinnest portion may be located at a position other than the center $C_L$. For example, the second part 102B may be formed in a wedge shape so that the thinnest portion is located on the top side surface and the thickness varies from the bottom side surface to the top side surface. When the second part 102B is formed in a wedge shape, the wedge shape may be formed so that the thickness decreases from the top side surface to the bottom side surface. For example, in the case where the second part 102B extends in the horizontal direction, the second part 102B may be formed in a wedge shape and the thickness decreases from the left side surface to the right side surface. When the second part 102B is formed in the wedge shape, the light sources may be arranged only on one side surface having the larger thickness of two side surfaces.

In the first part 102A, the light sources may be arranged in the bottom side surface regardless of the sectional shape of the second part 102B, or the light sources may be arranged on the top side surface, or the light sources may be arranged on both side surfaces. As in the second modified example shown in FIG. 5B, when the first part 102A is much smaller than the second part 102B, the light sources may not be arranged on two side surfaces of the first part 102A.

In this embodiment, the sectional shape of the first part 102A in the top-and-bottom direction is rectangular and the first part is formed in a rectangular parallelepiped shape with a constant thickness, but the sectional area of the first part 102A in the top-and-bottom direction is greater than that of the at least the second part 102B to reinforce the second part 102B. In this embodiment, the entire first part 102A is formed with a constant thickness, but the first part 102A may partially have a portion with a constant thickness.

Second Embodiment

This embodiment is an example where micro shapes are used as the light ejecting means so as to set different emission angle distributions of the rays emitted from the emission surfaces 102D of the first part 102A and the second part 102B to be substantially the same emission angle distribution. In this embodiment, first light ejecting portions are disposed in the first part 102A, second light ejecting portions are disposed in the second part 102B, and the light ejecting portions are formed on the rear surfaces 102E and 102F of the light guide plate 102 at the time of injection molding. The details of the first light ejecting portions and the second light ejecting portions will be described later.

Figure 6A:
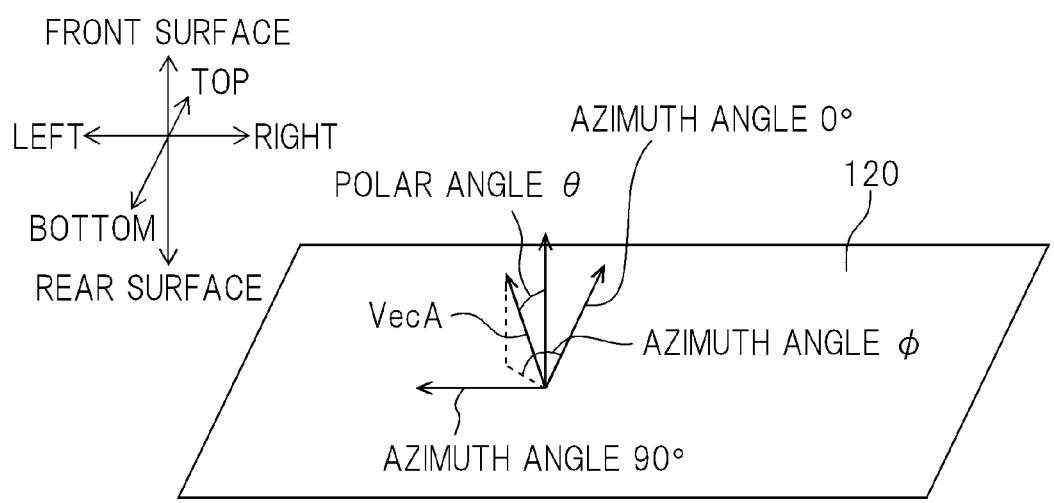
FIG. 6A is a diagram illustrating the definition of angles used to explain an emission angle distribution.

In describing the emission angle distribution, angles are defined using FIG. 6A for the purpose of convenience. FIG. 6A shows a vector VecA having a predetermined direction and a coordinate system. The vector VecA has a direction with a polar angle θ and an azimuth angle ψ. The polar angle is an angle from the normal line of the liquid crystal panel. The azimuth angle is an angle from an axis parallel to the upward direction in the liquid crystal panel plane. According to the definition of angles, the normal direction of the liquid crystal panel is a direction with a polar angle of 0 degree. The upward direction has an azimuth angle of 0 degree, the left direction has an azimuth angle of 90 degrees, the downward direction has an azimuth angle of 180 degrees, and the right direction has an azimuth angle of 270 degrees.

Figure 6B:
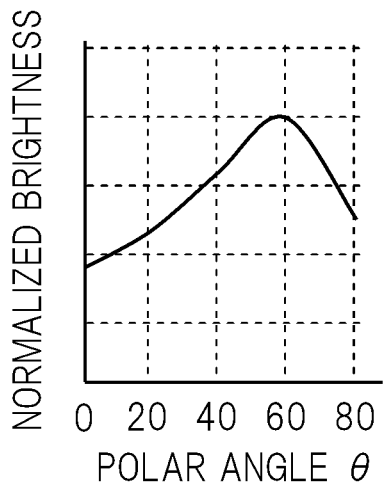
FIG. 6B is a diagram schematically illustrating the emission angle distribution at a position of a predetermined emission distance in the first part.
Figure 6C:
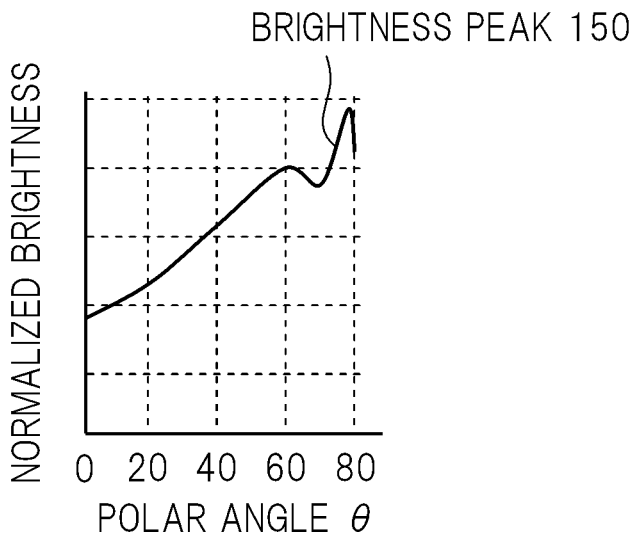
FIG. 6C is a diagram schematically illustrating the emission angle distribution at a position of a predetermined emission distance in the second part.

The emission angle distribution when the scattering dots are used will be described with reference to FIGS. 6B and 6C, for example, using the optical system shown in FIGS. 4A to 4C. In the explanation of the second embodiment, the configuration shown in FIGS. 4A to 4C is the same as described in the first embodiment. FIG. 6B is a schematic diagram illustrating the emission angle distribution at a position with an emission distance Dx1 (the amount defined in the first embodiment) of the first part 102A. FIG. 6C is a schematic diagram illustrating the emission angle distribution at a position with the emission distance Dx1 of the second part 102B. The emission angle distributions shown in FIGS. 6B and 6C are distributions where the emission distance Dx1 is set to about ½$L_x$ where $L_x$ represents the distance between the incidence surface 102C and the center $C_L$ (see FIGS. 4A to 4C). In FIGS. 6B and 6C, the vertical axis represents normalized brightness normalized with the brightness of about 60 degrees. The horizontal axis represents a distribution with a polar angle of θ and an azimuth angle of 0 degree. FIG. 6B is different from FIG. 6C in the angle distribution at angles equal to or greater than about 60 degrees. FIG. 6C shows a distribution in which a brightness peak 150 exists at a polar angle greater than 60 degrees. Since the brightness peak exists, the emission angle distributions of the first part 102A and the second part 102B at the position with the same emission distance Dx1 are different from each other. When the difference in emission angle distribution is not suppressed, the emission angle distributions are different depending on the position and thus the deviation is recognized. The deviation due to the difference in emission angle distribution is caused due to the existence of the first part 102A having a constant thickness and the second part 102B having a varying thickness depending on the position in a single light guide plate. The deviation due to the difference in emission angle distribution can be suppressed using plural optical sheets 134, but it is preferable that the number of optical sheets 134 can be reduced to reduce the industrial waste.

In this embodiment, the configuration for reducing the difference in emission angle distribution between the first part 102A and the second part 102B at the time of emitting light from the emission surface 102D will be described.

The reason for the brightness peak 150 will be described. In the first embodiment, since the light ejecting means of the first part 102A includes only the scattering dots 1021 but the light ejecting means of the second part 102B includes the light ejecting portions of the inclined light ejecting mechanism in addition to the scattering dots 1021, the brightness peak 150 exists in the emission angle distribution of the second part 102B.

Regarding the sharp brightness peak at a large polar angle due to the inclined light ejecting mechanism, as described in the first embodiment, the inclined light ejecting mechanism collapses the total reflection condition due to the slope (including a curve) of the rear surface 102F while light is reflected several times between the emission surface 102D and the rear surface 102F of the second part 102B, and emits light. Accordingly, the amount of rays emitted just after the total reflection condition is collapsed increases, and the angle formed by the ray on the light guide plate side and the normal line of the liquid crystal panel in the emission surface 102D becomes close to the threshold angle.

The configuration of the second embodiment will be described with reference to FIGS. 7A to 7D. FIGS. 7A to 7D are diagrams illustrating the light guide plate 102 mounted on the liquid crystal display device according to this embodiment. The light guide plate 102 in this embodiment is divided into plural parts in the long-axis direction of the liquid crystal panel 120, similarly to the first embodiment, and the plural parts include the first part 102A and the second part 102B.

The thickness $t_L$ of the second part 102B in the normal direction of the liquid crystal panel (in the forward direction) varies depending on the position in the top-and-bottom direction. The thickness of the first part 102A does not depend on the position but is constant. The thickest portion in the light guide plate 102 according to this embodiment is the first part 102A.

Figure 7A:
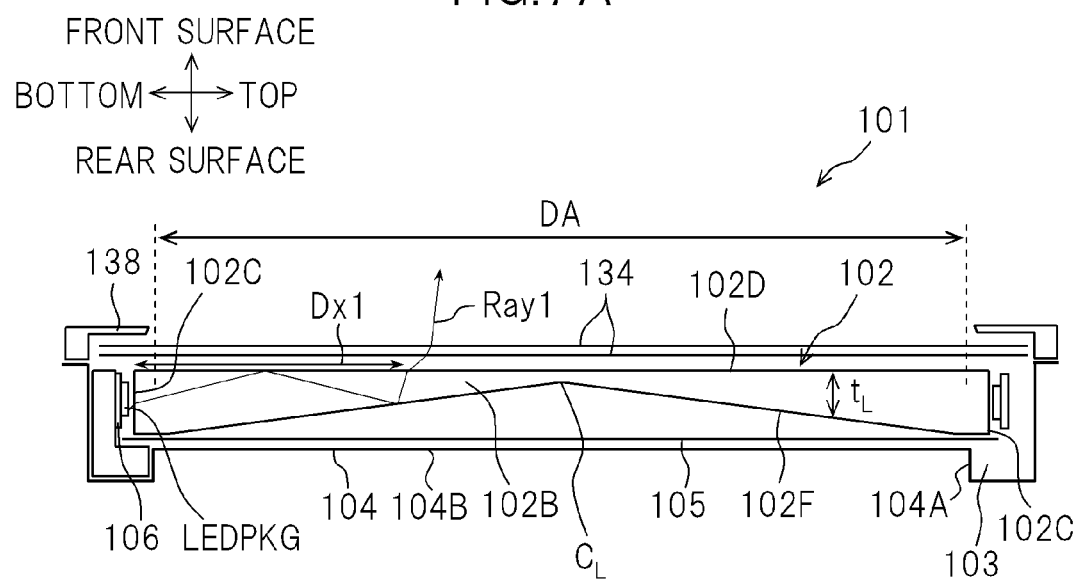
FIG. 7A is a sectional view of a liquid crystal display device according to a second embodiment of the invention taken along line B-B.
Figure 7B:
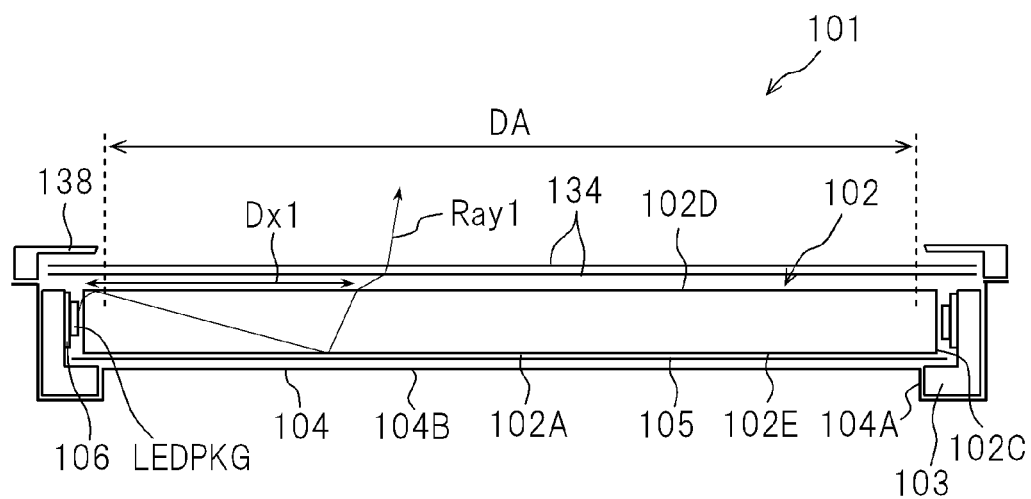
FIG. 7B is a sectional view of the liquid crystal display device according to the second embodiment of the invention taken along line C-C.

The same configurations as described in the first embodiment will not be described. The reference numerals in the drawings are the same as the first embodiment. FIG. 7A is a sectional diagram taken along line B-B of FIG. 1 and FIG. 7B is a sectional view taken along line C-C of FIG. 1.

Figure 7C:
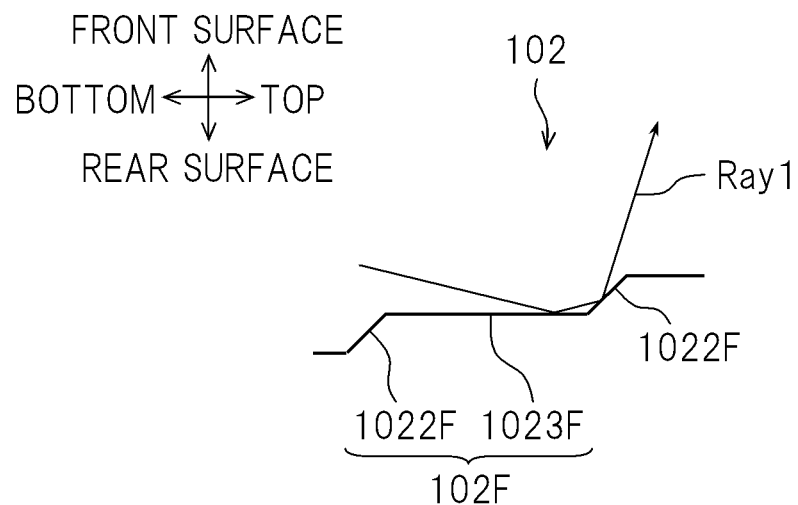
FIG. 7C is an enlarged view of a portion, from which a ray (see FIG. 7A) is reflected, of the rear surface of the second part according to the second embodiment.
Figure 7D:
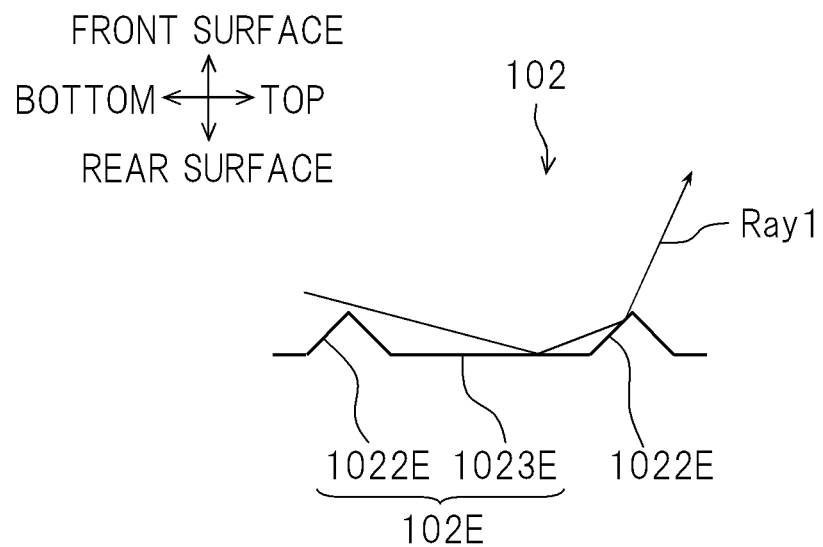
FIG. 7D is an enlarged view of a portion, from which a ray (see FIG. 7B) is reflected, of the rear surface of the first part according to the second embodiment.

The light ejecting means in the second part 102B according to this embodiment is formed of micro shapes by the injection molding. FIG. 7C is an enlarged view of the rear surface 102F of the second part 102B in the vicinity of a portion where the ray Ray1 (see FIG. 7A) is reflected and FIG. 7D is an enlarged view of the rear surface 102E of the first part 102A in the vicinity of a portion where the ray Ray1 (see FIG. 7B) is reflected. That is, plural second light ejecting portions 1022F serving to eject light and plural second rear-surface shaped portions 1023F are alternately arranged on the rear surface 102F between the bottom side surface and the thinnest portion in the second part 102B. Plural first light ejecting portion 1022E serving to eject light and plural first rear-surface shaped portions 1023E are alternately arranged on the rear surface 102E of the first part 102A formed in a rectangular parallelepiped shape with a constant thickness. The second rear-surface shaped portions 1023F and the first rear-surface shaped portions 1023E each include a flat portion which is a plane parallel to the emission surface 102D. Since both the second rear-surface shaped portions 1023F and the first rear-surface shaped portions 1023E include the flat portion, it is possible to reduce the difference in emission angle distribution.

The second light ejecting portions 1022F and the first light ejecting portions 1022E are an example of the light ejecting means in this specification. The first light ejecting portion 1022E and the second light ejecting portions 1022F reflect light to emit the light from the emission surface 102D. A feature of this configuration is that when the light ejecting means of the first part 102A is formed of micro shapes, the light ejecting means of the second part 102B is formed of micro shapes and the same light ejecting means is formed in the first part 102A and the second part 102B.

The first light ejecting portions 1022E of the first part 102A have a groove shape formed by indenting the rear surface of the light guide plate 102 toward the emission surface and particularly a V shaped groove. In a sectional view, the groove has a triangular shape and ejects light from the emission surface 102D of the light guide plate 102 by reflecting the light by the use of one of two slopes. In the second part 102B, light is reflected by the slope of each second light ejecting portion 1022F and is emitted from the emission surface 102D. Here, since the second part 102B is formed to decrease the thickness of the light guide plate 102 toward the center $C_L$, the thickness of the light guide plate 102 slowly decreases by the repetition of the slope of the second light ejecting portion 1022F and the second rear-surface shaped portion 1023F. The reason for forming the rear surface 102F of the second part 102B by the repetition of the slope of the second ejecting portion 1022F and the second rear-surface shaped portion 1023F instead of forming the rear surface out of a curve or a straight line is as follows. That is, since the second light ejecting portion 1022F forms a step between two second rear-surface shaped portions 1023F adjacent thereto to form the rear surface 102F in a stepped shape, it is possible to suppress the slope of the second rear-surface shaped portion 1023F, to suppress the brightness peak at an angle greater than 60 degrees, and to easily suppress the deviation due to the difference in emission angle distribution. When the second rear-surface shaped portion 1023F includes the flat portion, the flat portion only regularly reflects light (does not contribute to the light ejection), thereby further suppressing the brightness peak and more easily suppressing the deviation due to the difference in emission angle distribution. That is, by mainly controlling the light ejection using the second light ejecting portions 1022F, the slope of the second rear-surface shaped portion 1023F is slower than the slope of the straight line shape, in comparison with the case where the rear surface 102F of the second part 102B is formed out of a straight-line slope. Accordingly, in the reflection in the second rear-surface shaped portion 1023F, the total reflection condition is hardly collapsed. The brightness peak 150 (see FIG. 6C) is suppressed and the deviation due to the difference in emission angle distribution is reduced.

The second light ejecting portions 1022F of the second part 102B perform two functions of varying the thickness of the light guide plate 102 and ejecting light. In this embodiment, the second light ejecting portions 1022F of the second part 102B has a different shape from the first light ejecting portions 1022E of the first part 102A so as to vary the thickness. The first part 102A and the second part 102B have different densities or position distributions of the second light ejecting portions 1022F and the first light ejecting portions 1022E so as to adjust the emitted light intensity.

In the vicinity of the thinnest portion of the second part 102B (in the vicinity of the center $C_L$ in FIG. 7A), the optical path until light is reflected by the rear surface 102F of the second part 102B and then reaches the rear surface 102F again is smaller than the optical path in the vicinity of the adjacent portion of the first part 102A adjacent to the thinnest portion.

Therefore, with the same emission distance, the density of the second light ejecting portions 1022F in the second part 102B is smaller than the density of the first light ejecting portions 1022E in the first part 102A.

In this embodiment, the first rear-surface shaped portions 1023E and the second rear-surface shaped portions 1023F of the first part 102A and the second part 102B have a common structure (FIGS. 7C and 7D), for example, including the flat portion. By forming the two second light ejecting portions 1022F or the two first light ejecting portions 1022E in the same structure, it is possible to reduce the deviation due to the difference in emission angle distribution. As shown in FIGS. 7C and 7D, it can be seen that the ray Ray1 is emitted from the second light ejecting portions 1022F and the first light ejecting portions 1022E through the same reflection course.

The second light ejecting portions 1022F and the first light ejecting portions 1022E shown in FIGS. 7C and 7D are an example of a simple micro shape, from which various advantages described above can be obtained. It is also possible to reduce a design time.

The decrease in weight causes a decrease in amount of the material of the light guide plate and a decrease in industrial waste.

Modified Examples

Figure 8A:
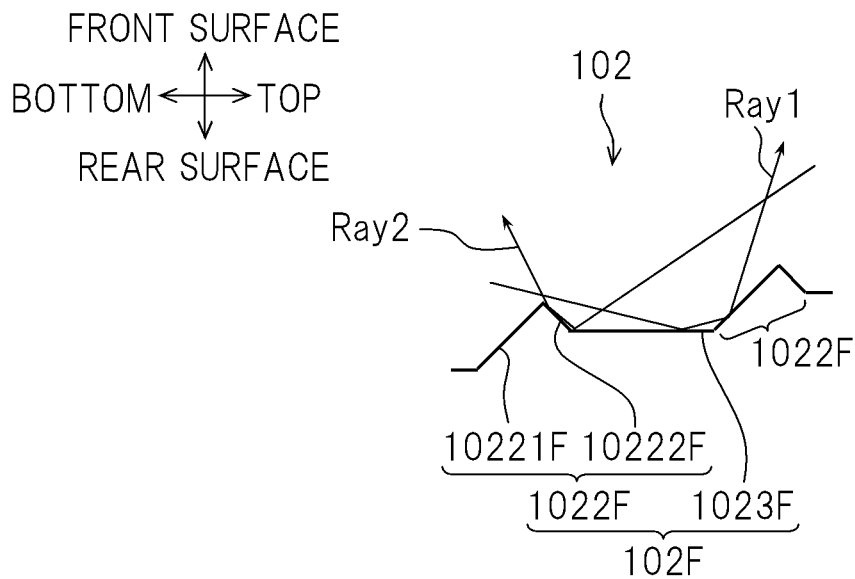
FIG. 8A is an enlarged view of a portion, from which a ray (see FIG. 7A) is reflected, of the rear surface of the second part according to a first modified example of the second embodiment.

Several modified examples of the second embodiment of the invention will be described below. FIG. 8A is an enlarged view of the rear surface 102F of the second part 102B shown in FIG. 7A in the vicinity of the portion by which the ray Ray1 is reflected, similarly to FIG. 7C, and is a diagram illustrating a first modified example of the second embodiment. The ray Ray2 traveling from the upside to the downside is also shown. At this time, it is assumed that the first part 102A is the same structure as shown in FIGS. 7B and 7D. FIG. 8A is different from FIG. 7C, in that the second light ejecting portion 1022F shown in FIG. 8A includes a second slope face 10222F facing the upside in addition to the first slope face 10221F facing the downside (these slope faces are referred to as "reflecting surfaces" in this specification). In this modified example, the second light ejecting portion 1022F includes the first slope face 10221F and the second slope face 10222F and is indented with respect to two second rear-surface-shaped portions 1023F adjacent thereto so that the section thereof has a triangular groove shape. The first slope face 10221F and the second slope face 10222F may be formed in a curved shape. Most of the rays incident from the incidence surface are emitted from the light guide plate 102 by the second light ejecting portions 1022F from the incidence surface 102C to the center $C_L$, but the other rays travel toward an incidence surface opposite to the incidence surface over the center $C_L$. The second slope face 10222F inclined to the upside in FIG. 8A is a reflecting surface reflecting the rays (the ray Ray2 in FIG. 8A) traveling over the center $C_L$ and emitting the reflected rays. When the second slope face 10222F facing the upside in FIG. 8A is not disposed, some rays traveling over the center $C_L$ reach the incidence surface opposite to the incidence surface 102C on which the rays are incident and are emitted and lost from the opposite incident surface. The second slope face 10222F inclined to the upside in FIG. 8A is effective for suppressing the loss. Since the first light ejecting portion 1022E (see FIG. 7D) of the first part 102A includes the first slope face and the second slope face inclined to the upside and the downside, this configuration is also effective for matching the emission angle distribution with that of the first part 102A.

In order to suppress the loss and the deviation due to the difference in emission angle distribution, it is preferable that the first light ejecting portion 1022E and the second light ejecting portion 1022F each include at least two reflecting surfaces which are inclined to two side surfaces.

A feature of the first modified example shown in FIG. 8A is that the first light ejecting portion 1022E of the first part 102A and the second light ejecting portion 1022F of the second part 102B have different shapes but have the same number of reflecting surfaces. Since the first light ejecting portion 1022E and the second light ejecting portion 1022F have the same number of control surfaces, it is easy to design the light guide plate 102. For example, by providing only a flat portion to the first rear-surface shaped portion 1023E and the second rear-surface shaped portion 1023F and setting the number of control surfaces to be the same in the first light ejecting portion 1022E and the second light ejecting portion 1022F, it is easier to design the light guide plate 102.

Figure 8B:
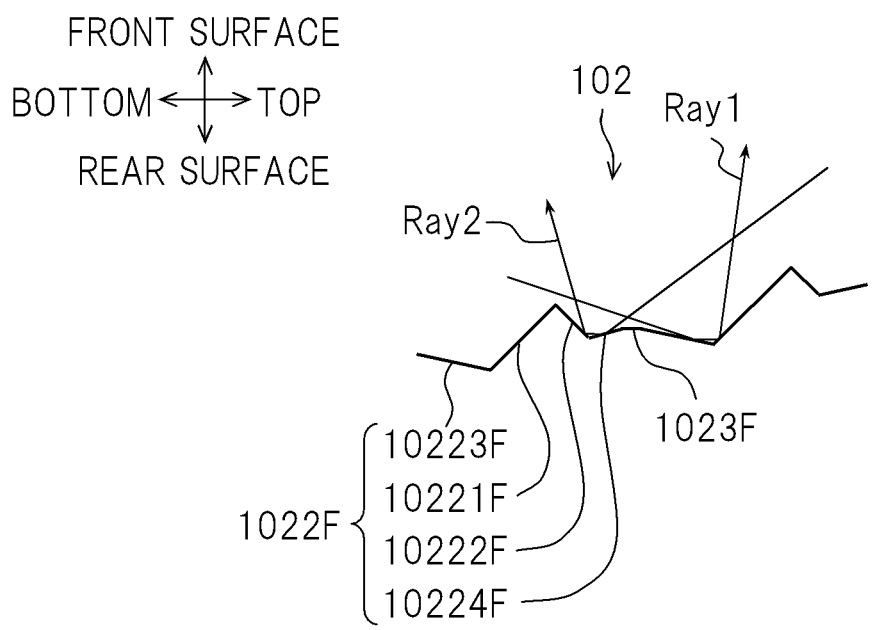
FIG. 8B is an enlarged view of a portion, from which a ray (see FIG. 7A) is reflected, of the rear surface of the second part according to a second modified example of the second embodiment.

FIG. 8B is an enlarged view of the rear surface 102F of the second part 102B shown in FIG. 7A in the vicinity of the portion by which the ray Ray1 is reflected, similarly to FIG. 7C, and is a diagram illustrating a second modified example of the second embodiment. In the second modified example shown in FIG. 8B, the second light ejecting portion 1022F includes plural reflecting surfaces (10221F, 10222F, 10223F, and 10224F) so as to emit the ray reflected by the second light ejecting portion 1022F in a direction close to the normal direction of the liquid crystal panel. As shown in FIG. 8B, the second light ejecting portion 1022F includes a first slope face 10221F and a second slope face 10222F. In this modified example, the second rear-surface shaped portion 1023F which is a flat portion is disposed between the two second light ejecting portions 1022F. The first light ejecting portion 1022E of the first part 102A in the second modified example shown in FIG. 8B is shown in FIG. 8C. The first light ejecting portion 1022E of the first part 102A also includes plural reflecting surfaces (10221E, 10222E, 10223E, and 10224E) so as to emit the ray reflected by the first light ejecting portion 1022E in the direction close to the normal direction of the liquid crystal panel. As shown in FIG. 8C, the first light ejecting portion 1022E includes a first slope face 10221E and a second slope face 10222E. In this modified example, for the purpose of matching the emission angle distributions with each other, when the second light ejecting portion 1022F of the second part 102B includes the plural reflecting surfaces (10221F, 10222F, 10223F, and 10224F) so as to emit a lot of rays in a specific direction, the first part 102A also includes the same plural reflecting surfaces (10221E, 10222E, 10223E, and 10224E). The first rear-surface shaped portion 1023E and the second rear-surface shaped portion 1023F including a flat portion parallel to the emission surface 102D is formed between two first light ejecting portions 1022E and two second light ejecting portions 1022F. The first light ejecting portion 1022E is formed in a groove shape indented with respect to two first rear-surface shaped portions 1023F adjacent thereto. The second light ejecting portion 1022F is similarly formed in a groove shape indented with respect to two second rear-surface shaped portions 1023F adjacent thereto so as to form a step between the two rear-surface shaped portions 1023F.

FIG. 8D is a diagram illustrating a third modified example of the second embodiment and is an enlarged view of the rear surface 102F of the second part 102B shown in FIG. 7A in the vicinity of the portion by which the ray Ray1 is reflected, similarly to FIG. 7C. In this modified example, the second light ejecting portion 1022F is formed in a curved shape. FIG. 8E is a diagram illustrating a first light ejecting portion 1022E of the first part 102A in the third modified example, where the first light ejecting portion has a shape different from the second light ejecting portion 1022F and is formed in a curved shape. The rear-surface shaped portions 1023E and 1023F each having a flat portion parallel to the emission surface are formed between two first light ejecting portions 1022E and between two second light ejecting portions 1022F.

In this embodiment, the first rear-surface shaped portion 1023E and the second rear-surface shaped portion 1023F include a flat portion parallel to the emission surface 102D, but may not be exactly parallel thereto. A goal of this embodiment is to set the emission angle distribution to be the same in the first part 102A and the second part 102B by the combination of the first light ejecting portion 1022E and the second light ejecting portion 1022F, and the rear-surface shaped portions 1023E and 1023F may include a slow slope face. The slow slope face means that a slope angle thereof is slower than, for example, the slope angle in the case where the slope face is inclined from one side surface to the thinnest portion in a straight line. The first rear-surface shaped portion 1023E and the second rear-surface shaped portion 1023F can be set to be slower than the inclination (the angle of a straight line connecting a start point and an end point of a step-like thinning portion about the emission surface) of the step-like portion in the rear surface 102F of the second part 102B.

By assembling various features of the first embodiment into the configuration described in this embodiment, it is possible to obtain the same advantages as described in the first embodiment.

Third Embodiment

Figure 9B:
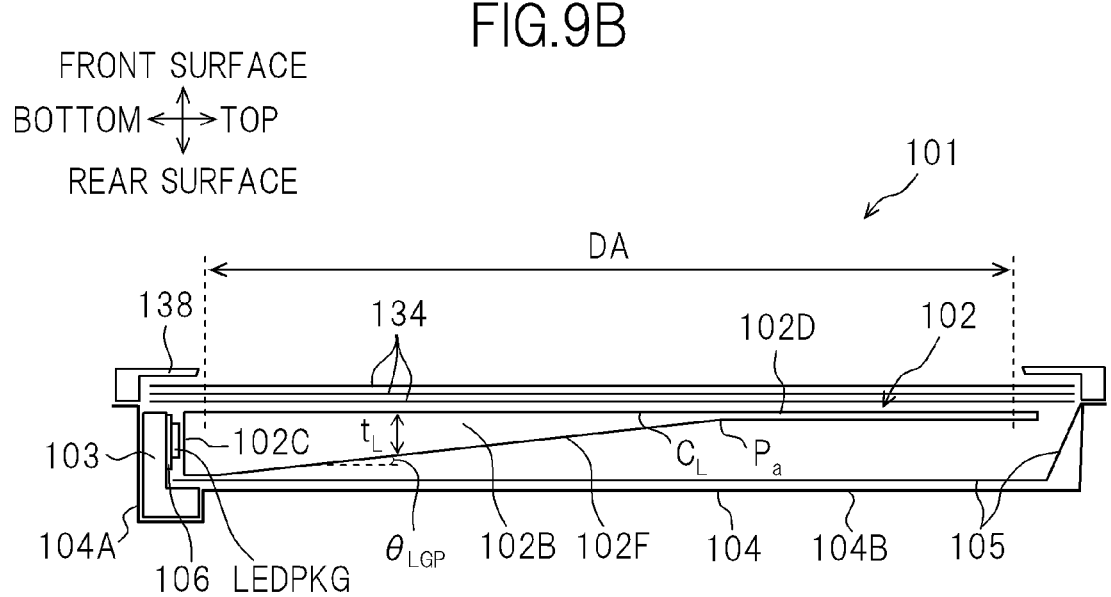
FIG. 9B is a sectional view in the top-and-bottom direction of the second part in the liquid crystal display device according to the third embodiment.
Figure 9C:
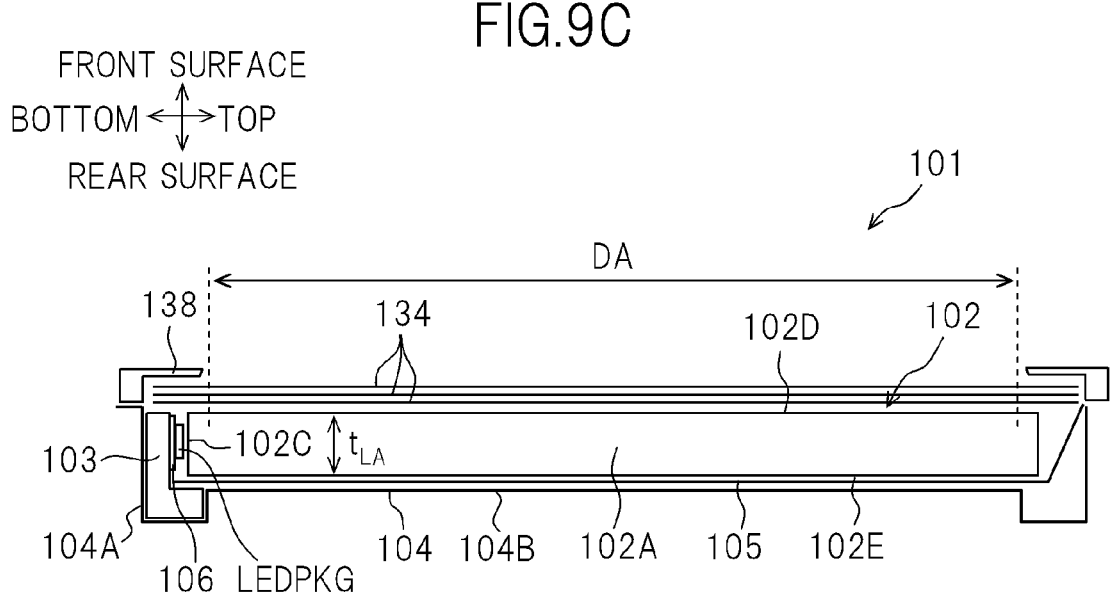
FIG. 9C is a sectional view in the top-and-bottom direction of the first part in the liquid crystal display device according to the third embodiment.

FIG. 9A is a diagram illustrating a sectional shape in the right-and-left direction at the center $C_L$ in the top-and-bottom direction of a liquid crystal display device according to a third embodiment of the invention, where the LED package LED-PKG is disposed on only the bottom side surface of the light guide plate 102. The reference numerals and signs in the drawing are the same as described in the first embodiment, as long as they are not particularly mentioned. FIG. 9B is a sectional view in the top-and-bottom direction of the second part 102B. FIG. 9C is a sectional view in the top-and-bottom direction of the first part 102A. In this embodiment, as shown in FIG. 9B, the thickness of the second part 102B close to the side surface opposite to the incidence surface 102C is smaller than that in the incidence surface 102C, the rear surface 102F is inclined from the incidence surface 102C to a predetermined position $P_a$, and the portion further extending from the position $P_a$ forms a flat surface. That is, in this embodiment, the flat portion extending from the position $P_a$ is the thinnest portion. The slope angle $\theta_{LGP}$ is roughly determined depending on the distance between the position $P_a$ and the incidence surface 102C. In general, with a larger slope angle $\theta_{LGP}$, it is more difficult to suppress the deviation due to the difference in emission angle distribution. Therefore, for the additional purpose of the decrease in weight, the position $P_a$ is located closer to the top side than the center $C_L$. The position $P_a$ may be matched with the side surface opposite to the incidence surface 102C and the rear surface 102F of the second part 102B may be formed of only the slope portion (in a so-called wedge-shaped second part 102B). The light ejecting means of the first part 102A and the second part 102B can employ various methods described in the first embodiment and the second embodiment. In this embodiment, since the rear surface 102F of the second part 102B is flat in the portion closer to the top side than the position $P_a$, the first part 102A may be equal in shape to the light ejecting means.

In this configuration, since the rear surface 102E of the first part 102A is disposed in the entire range in the top-and-bottom direction so as to be parallel to the bottom-frame flat portion 104B due to the existence of the first part 102A having a constant thickness, it is possible to stably dispose the light guide plate 102 without any fluctuation.

When the light guide plate does not include the first part 102A but includes only the second part 102B, the light guide plate 102 fluctuates to the front surface and the rear surface due to the gap between the rear surface 102F of the second part 102B and the lower-frame flat portion 104B. To suppress the fluctuation, when the rear surface 102F of the second part 102B is supported by the use of a support pin or the like so as not to fluctuate, the support pin damages the rear surface 102F of the second part 102B due to the vibration at the time of transporting the liquid crystal display device.

The method of suppressing the fluctuation using the first part 102A like this configuration is very simple and effective. By suppressing the fluctuation, the positional relationship between the LED package LEDPKG and the incidence surface 102C is fixed. Accordingly, it is possible to suppress the decrease in incidence efficiency.

By assembling various features of the first and second embodiments into the configuration described in this embodiment, it is possible to obtain the various advantages as described in the first and second embodiments.

Fourth Embodiment

Figure 10A:
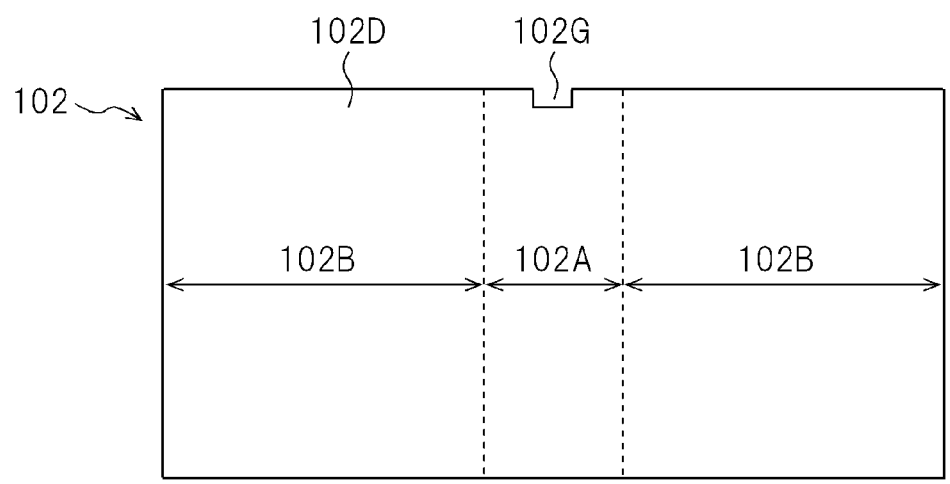
FIG. 10A is a plan view illustrating a light guide plate according to a fourth embodiment of the invention.
Figure 10B:
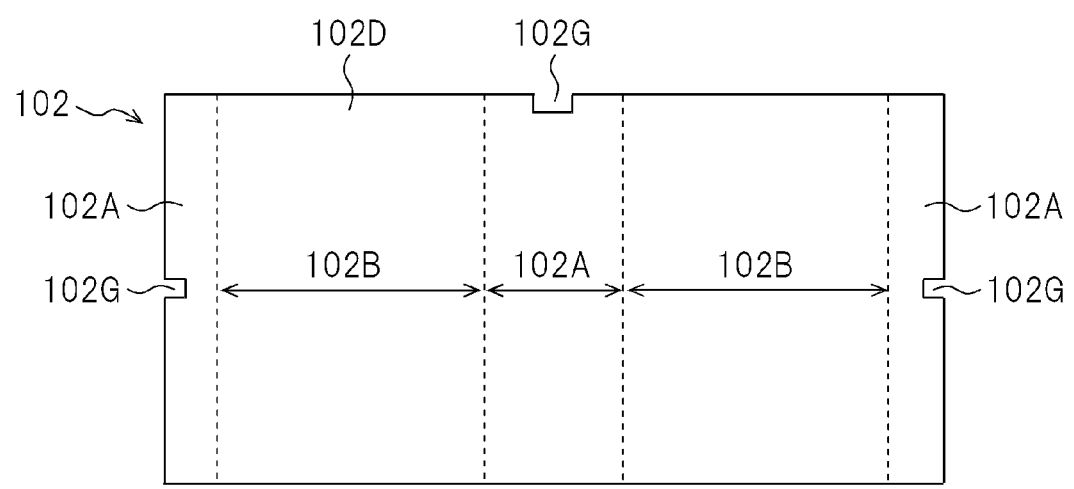
FIG. 10B is a plan view illustrating the light guide plate according to a first modified example of the fourth embodiment.
Figure 10C:
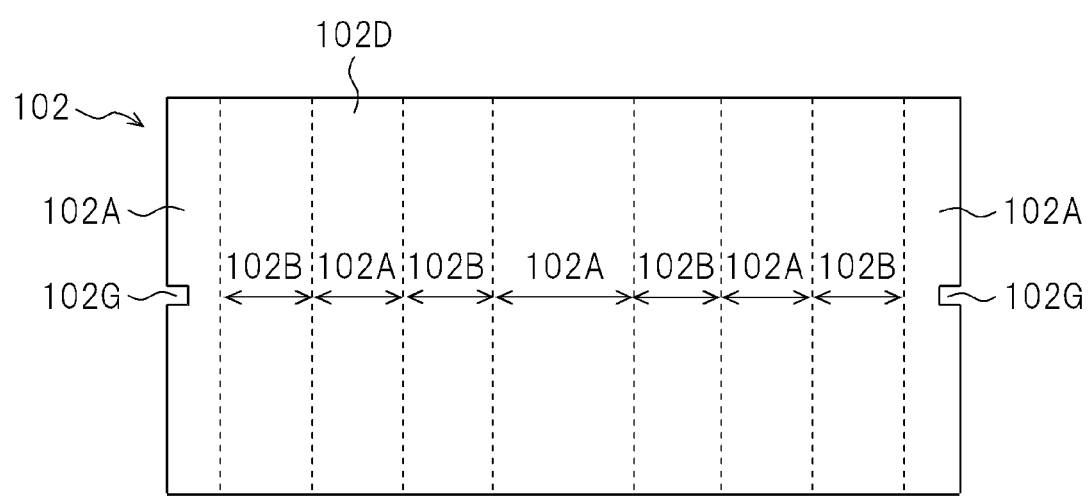
FIG. 10C is a plan view illustrating the light guide plate according to a second modified example of the fourth embodiment.

In the first to third embodiments, the first part 102A is disposed at both right and left ends of the light guide plate 102, but the invention is not limited to this configuration and the first part 102A may be disposed, for example, at the center in the right-and-left direction. FIG. 10A is a plan view of the light guide plate 102 according to a fourth embodiment of the invention. In this embodiment, by disposing the first part 102A at the center between two second parts 102B, it is possible to reinforce the structure of the light guide plate 102. FIG. 10B is a diagram illustrating a first modified example of the fourth embodiment, where the first part 102A is disposed at both right and left ends and the center. FIG. 10C is a diagram illustrating a second modified example of the fourth embodiment, where plural first parts 102A and plural second parts 102B are alternately arranged. FIGS. 10A to 10C are plane views of the light guide plate 102 as viewed from the front side. The fixing shape 102G is formed in the first part 102A in any examples. The fixing shape 102G is preferably formed in a portion having the largest thickness and the largest strength. The reference numerals and signs in the drawings are the same as described in the first embodiment, as long as they are not mentioned particularly.

By assembling various features of the first to third embodiments into any configuration shown FIGS. 10A to 10C, it is possible to obtain the various advantages as described in the first to third embodiments.

In the above-mentioned embodiments, the light guide plate 102 includes one or more first parts 102A and one or more second parts 102B, but may include at least one first part 102A and at least one second part 102B.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
a liquid crystal panel that has a display area for displaying an image;
a light guide plate that has an emission surface emitting light to the liquid crystal panel and a plurality of side surfaces extending from the emission surface; and
a plurality of light sources that inputs light to the light guide plate from at least one side surface of the plurality of side surfaces,
wherein the light guide plate is divided into a plurality of parts extending from the one side surface to the side surface opposite to the one side surface and the plurality of parts include at least one first part and at least one second part,
wherein the first part and the second part are adjacent to each other, have different sectional shapes in the extending direction, and two-dimensionally overlap with the display area, respectively,
wherein at least the second part has a shape for guiding the light incident on the light guide plate and emitting the light from the emission surface,
wherein the first part has a sectional area of the sectional shape greater than that of the second part,
wherein a direction perpendicular to the extending direction of the plurality of parts is a width direction of the plurality of parts, and
wherein a total length of the width direction of the at least one second part included in the plurality of parts is greater than a total length of the width direction of the at least one first part included in the plurality of parts,
wherein a total number of a plurality of light sources which input light to the at least one second part is more than a total number of a plurality of light sources which input light to the at least one first part.

2. The liquid crystal display device according to claim 1, wherein the sectional area in the extending direction of the first part in the portion overlapping with the display area is greater than the sectional area in the extending direction of the second part in the portion overlapping with the display area.

3. The liquid crystal display device according to claim 2, wherein the second part includes a thinnest portion having the smallest thickness in the second part,
wherein the thinnest portion is located away from the at least one side surface by a predetermined distance,
wherein the first part includes an adjacent portion being adjacent to the thinnest portion at the position away from the one side surface by the predetermined distance, and
wherein the adjacent portion has a thickness greater than that of the thinnest portion.

4. The liquid crystal display device according to claim 3, wherein the first part has a thickness greater than the second part in the range from the adjacent portion to the position which is half of the predetermined distance away from the one side surface.

5. The liquid crystal display device according to claim 3, wherein the thickness of the thinnest portion, is equal to or less than ¾ of the thickness of the one side surface in the second part.

6. The liquid crystal display device according to claim 3, wherein the thickness of the thinnest portion is smaller than that of the one side surface in the second part, and
wherein the thickness of the second part varies between the one side surface and the thinnest portion.

7. The liquid crystal display device according to claim 1, wherein the plurality of light sources are arranged on the one side surface or two side surfaces of the one side surface and the side surface opposite thereto, and causes light to be incident on the light guide plate,
wherein one portion of the plurality of light sources are arranged on the one side surface or the one side surface and the side surface opposite thereto in the second part and supply light thereto, and
wherein another portion of the plurality of light sources are arranged on at least one of the one side surface and the side surface opposite thereto in the first part and supply light thereto.

8. The liquid crystal display device according to claim 1, wherein the one side surface is one of the top and bottom side surfaces of the light guide plate, and is a side surface extending in the horizontal direction of the light guide plate,
wherein the first part includes one of the left and right side surfaces of the light guide plate, and
wherein the length in the horizontal direction of the first part is equal to or greater than 2.5% of the length in the horizontal direction of the one side surface.

9. The liquid crystal display device according to claim 1, wherein the plurality of parts include at least two second parts, and
wherein one of the first parts included in the plurality of parts is disposed between two second parts.

10. The liquid crystal display device according to claim 7, wherein the plurality of light sources are arranged on two side surfaces of the one side surface and the side surface opposite thereto and causes light to be incident on the light guide plate,
wherein the one portion of the plurality of light sources are arranged on the one side surface and the side surface opposite thereto in the second parts and supply light thereto, and
wherein the second part includes a thinnest portion having the smallest thickness in the second part at a position separated away from the one side surface and the side surface opposite thereto, and the thickness of the second part varies between the one side surface and the thinnest portion and between the side surface opposite thereto and the thinnest portion.

11. The liquid crystal display device according to claim 7, wherein the light intensity supplied to the first part from the other portion of the plurality of light sources per unit length in the width direction, is smaller than the light intensity supplied to the second part from the one portion of the plurality of light sources per unit length in the width direction.

12. The liquid crystal display device according to claim 1, wherein the first part and the second part include scattering dots for reflecting light to emit the light from the emission surface on the rear surface opposite to the emission surface, and
wherein the scattering dots in the first part and the scattering dots in the second part, have at least one of different shapes and different density distributions.

13. The liquid crystal display device according to claim 1, wherein the first part includes a plurality of first light ejecting portions reflecting light to emit the light from the emission surface on the rear surface opposite to the emission surface,
wherein the second part includes a plurality of second light ejecting portions reflecting light to emit the light from the emission surface on the rear surface, and
wherein the first light ejecting portions and the second light ejecting portions are formed on the rear surface by injection molding.

14. The liquid crystal display device according to claim 13, wherein the first part includes a plurality of first rear-surface shaped portions in addition to the plurality of first light ejecting portions, and the plurality of first light ejecting portions and the plurality of first rear-surface shaped portions are alternately arranged on the rear surface,
wherein the second part includes a plurality of second rear-surface shaped portions in addition to the plurality of second light ejecting portions, and the plurality of second light ejecting portions and the plurality of second rear-surface shaped portions are alternately arranged on the rear surface, and
wherein the plurality of first rear-surface shaped portions and the plurality of second rear-surface shaped portions, include a flat face parallel to the emission surface.

15. The liquid crystal display device according to claim 13, wherein the first part includes a plurality of first rear-surface shaped portions in addition to the plurality of first light ejecting portions, and the plurality of first light ejecting portions and the plurality of first rear-surface shaped portions are alternately arranged on the rear surface,
wherein the second part includes a plurality of second rear-surface shaped portions in addition to the plurality of second light ejecting portions, and the plurality of second light ejecting portions and the plurality of second rear-surface shaped portions, are alternately arranged on the rear surface,
wherein the second part includes a thinnest portion having the smallest thickness in the second part, and the thickness of the second part varies between the one side surface and the thinnest portion,
wherein one of the second light ejecting portions between the one side surface and the thinnest portion, form a step between the second rear-surface shaped portion adjacent to the one of the second light ejecting portions by arrangement on side where the one side surface is located and the second rear-surface shaped portion adjacent to the one of the second light ejecting portions by arrangement on side where the thinnest portion is located, and
wherein the rear surface in the second part has a stepped shape between the one side surface and the thinnest portion.

16. The liquid crystal display device according to claim 13, wherein the first part includes a plurality of first rear-surface shaped portions in addition to the plurality of first light ejecting portions, and the plurality of first light ejecting portions and the plurality of first rear-surface shaped portions are alternately arranged on the rear surface,
wherein the second part includes a plurality of second rear-surface shaped portions in addition to the plurality of second light ejecting portions, and the plurality of second light ejecting portions and the plurality of second rear-surface shaped portions, are alternately arranged on the rear surface, and
wherein the plurality of first light ejecting portions and the plurality of second light ejecting portions, are indented from two neighboring rear-surface shaped portions.

17. The liquid crystal display device according to claim 13, wherein the number of control faces in each first light ejecting portion is equal to the number of control faces in each second light ejecting portion.

18. The liquid crystal display device according to claim 1, wherein the first part has a portion with a constant thickness.

19. The liquid crystal display device according to claim 1, wherein the light guide plate is an all-in-one molded product.

20. The liquid crystal display device according to claim 1, further comprising a chassis that receives the light guide plate,
wherein the first part includes a fixing shape for fixing the light guide plate to the chassis.

21. The liquid crystal display device according to claim 1, wherein some of the plurality of light sources are arranged on the one side surface in the second part,
wherein the second part includes an incidence portion causing light from the light sources to be incident on the one side surface, and
wherein some of the plurality of light sources are arranged to face the incidence portion.

22. The liquid crystal display device according to claim 13, wherein the plurality of second light ejecting portions and the plurality of first light ejecting portions, have different shapes.

23. A liquid crystal display device comprising:
a liquid crystal panel that has a display area for displaying an image;
a light guide plate that has an emission surface emitting light to the liquid crystal panel and a plurality of side surfaces extending from the emission surface; and
a plurality of light sources that inputs light to the light guide plate from at least one side surface of the plurality of side surfaces,
wherein the light guide plate is divided into a plurality of parts including at least one first part and at least one second part, each of the first part and the second part extending from the one side surface to the side surface opposite to the one side surface, and the at least one second part including a thickness-varying portion which continuously varies along the extending direction of the at least one second part,
wherein a direction perpendicular to the extending direction of the plurality of parts is a width direction of the plurality of parts,
wherein the first part and the second part are adjacent to each other, have different sectional shapes from each other in the extending direction, and two-dimensionally overlap with the display area, respectively, wherein at least the second part has a shape for guiding the light incident on the light guide plate and emitting the light from the emission surface, wherein the first part has a sectional area of the sectional shape greater than that of the second part, and wherein a total length of the width direction of the at least one second part included in the plurality of parts is greater than a total length of the width direction of the at least one first part included in the plurality of parts, wherein a total number of a plurality of light sources which input light to the at least one second part is more than a total number of a plurality of light sources which input light to the at least one first part.

24. The liquid crystal display device according to claim 1, wherein the light intensity per unit length of the width direction supplied to the first part is smaller than the light intensity per unit length in the width direction supplied to the second part.

\* \* \* \* \*